(12) United States Patent
Holman

(10) Patent No.: US 9,223,080 B2
(45) Date of Patent: Dec. 29, 2015

(54) LIGHT GUIDE WITH NARROW ANGLE LIGHT OUTPUT AND METHODS

(75) Inventor: Robert L. Holman, San Jose, CA (US)

(73) Assignee: Qualcomm MEMS Technologies, Inc., San Diego, CA (US)

( * ) Notice: Subject to any disclaimer, the term of this patent is extended or adjusted under 35 U.S.C. 154(b) by 571 days.

(21) Appl. No.: 13/454,931

(22) Filed: Apr. 24, 2012

(65) Prior Publication Data

US 2013/0278611 A1    Oct. 24, 2013

(51) Int. Cl.
*F21V 8/00* (2006.01)

(52) U.S. Cl.
CPC ............ *G02B 6/0046* (2013.01); *G02B 6/0061* (2013.01); *G02B 6/0078* (2013.01)

(58) Field of Classification Search
CPC ... G02B 6/0046; G02B 6/0078; G02B 6/0061
USPC .......... 345/501; 264/1.25; 359/238; 362/611, 362/615, 619
See application file for complete search history.

(56) References Cited

U.S. PATENT DOCUMENTS

| | | | |
|---|---|---|---|
| 3,923,381 | A | 12/1975 | Winston |
| 4,460,939 | A | 7/1984 | Murakami et al. |
| 4,861,124 | A | 8/1989 | Labaugh et al. |
| 5,255,171 | A | 10/1993 | Clark |
| 6,183,100 | B1 | 2/2001 | Suckow et al. |
| 6,283,602 | B1 | 9/2001 | Kawaguchi et al. |
| 6,536,921 | B1 | 3/2003 | Simon |
| 6,667,582 | B1 | 12/2003 | Procter |
| 6,848,822 | B2 | 2/2005 | Ballen et al. |
| 6,895,163 | B2 | 5/2005 | Kawashima |
| 6,948,830 | B1 | 9/2005 | Petrick |
| 7,025,482 | B2 | 4/2006 | Yamashita et al. |
| 7,072,096 | B2 | 7/2006 | Holman et al. |
| 7,213,958 | B2 | 5/2007 | Ouderkirk et al. |

(Continued)

FOREIGN PATENT DOCUMENTS

| CN | 2872075 Y | 2/2007 |
|---|---|---|
| CN | 101994938 A | 3/2011 |

(Continued)

OTHER PUBLICATIONS

How is white light made with LEDs, May 2013, Lighting Research Center, Retrieved from the Internet: Jun. 17, 2013, < URL: http://www.lrc.rpi.edu/programs/nlpip/lightinganswers/led/whiteLight.asp >.

(Continued)

*Primary Examiner* — Maurice L McDowell, Jr.
(74) *Attorney, Agent, or Firm* — Knobbe, Martens, Olson & Bear, LLP

(57) ABSTRACT

This disclosure provides systems, methods, and apparatus for providing illumination. In one aspect, a light guide can be configured to propagate light received from a light source. The light can be propagated by total internal reflection (TIR) within the light guide. The light guide can include an output surface configured to output light and one or more light extraction elements, which are configured to redirect the light propagating in the light guide so that the light exits the light guide through the output surface. The light guide can have tapered side walls that are configured to at least partially collimate the light that is to exit out of the output surface. In some implementations, the light guide can be used to provide illumination for display devices, other electromechanical systems, or for lighting a room or task area.

25 Claims, 21 Drawing Sheets

(56) References Cited

U.S. PATENT DOCUMENTS

| | | |
|---|---|---|
| 7,293,906 B2 | 11/2007 | Mok et al. |
| 7,314,291 B2 | 1/2008 | Tain et al. |
| 7,407,313 B2 | 8/2008 | Schardt et al. |
| 7,497,608 B2 | 3/2009 | Wheatley et al. |
| 7,517,103 B2 | 4/2009 | Furuya et al. |
| 7,538,340 B2 | 5/2009 | Pang et al. |
| 7,594,745 B2 | 9/2009 | Chang |
| 7,614,775 B2 | 11/2009 | Iwasaki |
| 7,736,044 B2 | 6/2010 | Chew et al. |
| 7,832,878 B2 | 11/2010 | Brukilacchio et al. |
| 7,887,216 B2 | 2/2011 | Patrick |
| 7,889,430 B2 | 2/2011 | El-Ghoroury et al. |
| 7,905,635 B2 | 3/2011 | Boonekamp et al. |
| 7,946,721 B2 | 5/2011 | Chang |
| 7,997,781 B2 | 8/2011 | Kanade et al. |
| 8,003,998 B2 | 8/2011 | Bogner et al. |
| 8,071,990 B2 | 12/2011 | Bogner et al. |
| 8,309,969 B2 | 11/2012 | Suehiro et al. |
| 2002/0015124 A1 | 2/2002 | Sato et al. |
| 2003/0206416 A1 | 11/2003 | Mullally et al. |
| 2003/0235050 A1 | 12/2003 | West et al. |
| 2004/0096182 A1 | 5/2004 | Yamashita et al. |
| 2005/0007756 A1 | 1/2005 | Yu et al. |
| 2005/0128724 A1 | 6/2005 | Choi et al. |
| 2006/0009541 A1 | 1/2006 | Chen et al. |
| 2006/0012542 A1 | 1/2006 | Alden |
| 2006/0056166 A1 | 3/2006 | Yeo et al. |
| 2006/0209541 A1 | 9/2006 | Peck et al. |
| 2006/0268551 A1 | 11/2006 | Mok et al. |
| 2008/0049445 A1 | 2/2008 | Harbers et al. |
| 2008/0055518 A1 | 3/2008 | Jung |
| 2008/0084602 A1 | 4/2008 | Xu et al. |
| 2008/0170178 A1 | 7/2008 | Kubota et al. |
| 2009/0045722 A1 | 2/2009 | Bai et al. |
| 2009/0086508 A1 | 4/2009 | Bierhuizen |
| 2009/0323144 A1 | 12/2009 | Gruhlke et al. |
| 2010/0033988 A1 | 2/2010 | Chiu et al. |
| 2010/0053959 A1 | 3/2010 | Ijzerman et al. |
| 2010/0091507 A1 | 4/2010 | Li et al. |
| 2010/0134722 A1 | 6/2010 | Huang et al. |
| 2010/0183333 A1 | 7/2010 | Kim et al. |
| 2010/0201916 A1 | 8/2010 | Bierhuizen |
| 2010/0208488 A1 | 8/2010 | Luo |
| 2010/0208492 A1 | 8/2010 | Sugie et al. |
| 2010/0220478 A1 | 9/2010 | Fields et al. |
| 2010/0226118 A1 | 9/2010 | Baar |
| 2010/0315826 A1 | 12/2010 | Anderson et al. |
| 2010/0315833 A1 | 12/2010 | Holman et al. |
| 2011/0013417 A1 | 1/2011 | Saccomanno et al. |
| 2011/0044059 A1 | 2/2011 | Inoue et al. |
| 2011/0096570 A1 | 4/2011 | Vissenberg et al. |
| 2011/0107587 A1 | 5/2011 | Kolb |
| 2011/0164202 A1 | 7/2011 | Shiraishi et al. |
| 2011/0175533 A1 | 7/2011 | Holman et al. |
| 2011/0182086 A1 | 7/2011 | Mienko et al. |
| 2012/0014127 A1 | 1/2012 | Kanade et al. |
| 2013/0278612 A1 | 10/2013 | Holman et al. |
| 2013/0278846 A1 | 10/2013 | Holman et al. |
| 2013/0279197 A1 | 10/2013 | Holman |

FOREIGN PATENT DOCUMENTS

| | | |
|---|---|---|
| GB | 2478986 A | 9/2011 |
| GB | 2478987 A | 9/2011 |
| JP | 2006128041 A | 5/2006 |
| JP | 2011243512 A | 12/2011 |
| TW | 200742870 | 11/2007 |
| TW | 201007288 A | 2/2010 |
| TW | I325079 B | 5/2010 |
| WO | 0186198 A1 | 11/2001 |
| WO | 2011004306 A1 | 1/2011 |
| WO | 2011065705 A2 | 6/2011 |

OTHER PUBLICATIONS

International Search Report and Written Opinion—PCT/US2013/037647—ISA/EPO—Aug. 12, 2013.

Lee J. H. et al., "LED Light Coupler Design for a Ultra Thin Light Guide," Journal of the Optical Society of Korea, Sep. 2007, vol. 11, No. 3, pp. 1-5.

Peng C., et al., "A High Power Light Emitting Diode Module for Projection Display Application," 2010 11th International Conference on Electronic Packaging Technology & High Density Packaging, 2010, pp. 1412-1416.

Yu X.J., et al., "LED-Based Projection Systems," Journal of Display Technology, Sep. 2007, vol. 3 (3), pp. 295-303.

Taiwan Search Report—TW102114376—TIPO—Aug. 22, 2014.

| | Common Voltages | | | | |
|---|---|---|---|---|---|
| Segment Voltages | | $VC_{ADD\_H}$ | $VC_{HOLD\_H}$ | $VC_{REL}$ | $VC_{HOLD\_L}$ | $VC_{ADD\_L}$ |
| | $VS_H$ | Stable | Stable | Relax | Stable | Actuate |
| | $VS_L$ | Actuate | Stable | Relax | Stable | Stable |

LIGHT GUIDE WITH NARROW ANGLE LIGHT OUTPUT AND METHODS

TECHNICAL FIELD

This disclosure relates to systems and methods for providing illumination, such as for display devices or for lighting a room or task area, and to electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Light guides, such as light bars, can be used to transport light from a light source to illuminate display elements (e.g., IMODs) in a display device or to provide light for other lighting systems. Some available light guides are not capable of distributing light in configurations that are appropriate for particular lighting applications. For example, in some cases, a light source can be directly optically coupled to a light guide. For light sources providing a wide angle output of light, some light can enter the light guide at angles that do not experience total internal reflection (TIR) so that a larger amount of light exits the light guide near the input, which can reduce the uniformity of illumination provided in the display device. Accordingly, new illumination systems are continually being developed to meet the needs of display devices or to provide general ambient illumination.

SUMMARY

The systems, methods and devices of the disclosure each have several innovative aspects, no single one of which is solely responsible for the desirable attributes disclosed herein.

One innovative aspect of the subject matter described in this disclosure can be implemented in an illumination system including a light guide substantially having a shape of a bar with a length longer than a width, and formed of a material configured to propagate light therein. The light guide can include an elongate output surface and an elongate back side opposite the output surface. The output surface can be wider than the back side. Light extraction elements can be dispersed along the length of the light guide, and the light extraction elements can be configured to direct light out of the light guide through the output surface. The light guide can include one or more tapered side walls that extend from the output surface to the back side, and the tapered side walls can be configured to partially collimate the light directed out of the output surface.

A taper of the side walls can follow at least one of a tilted plane surface and a polynomially shaped surface. The side walls can have the shape of a compound parabolic concentrator (CPC) trough. A longitudinal axis can extend along the length of the light guide, and the one or more side walls of the light guide can be configured to partially collimate the light directed out of the output surface such that light that exits the output surface in a plane substantially orthogonal to the longitudinal axis can be substantially confined to a range of output angles of about ±60° or less relative to a direction normal to the output surface.

The side walls can be planar such that the light guide has a generally trapezoidal cross sectional shape. The side walls can converge at the back side of the light guide such that the light guide has a generally triangular cross sectional shape. The back side can include an elongate back surface opposite the output surface. The back surface can be substantially planar.

The light extraction elements can be reflective. The light extraction elements can include one or more scattering features. The light extraction elements can include one or more reflective facets. The light extraction elements can be located on the output surface of the light guide, and a reflector can be located proximate the back side of the light guide. The light extraction elements can be configured to turn incident light towards the reflector, and the reflector can be configured to redirect the turned light out of the output surface. The light extraction elements can be dispersed along substantially the entire length of the light guide.

The illumination system can include a light source configured to direct light into the light guide through a first end surface of the light guide, and the first end surface can extend between the output surface, the back side, and the side walls.

A display device can include the illumination system. The display can also include an array of display elements positioned to receive light from the illumination system. The display elements can be reflective. The display elements can include interferometric modulators (IMODs). The display device can include a processor that can be configured to communicate with the display elements. The processor can be configured to process image data. The display device can include a memory device that can be configured to communicate with the processor. The display device can include a driver circuit, which can be configured to send at least one signal to the display elements. The display device can include a controller, which can be configured to send at least a portion of the image data to the driver circuit. The display device can include an image source module, which can be configured to send the image data to the processor. The image source module can include at least one of a receiver, transceiver, and transmitter. The display device can include an input device, which can be configured to receive input data and to communicate the input data to the processor.

Another innovative aspect of the subject matter described in this disclosure can be implemented in an illumination system that includes a light guide substantially having a shape of a bar with a length longer than a width, and formed of a material configured to propagate light therein. The light guide can include an elongate output surface and an elongate back side opposite the output surface. The output surface can be wider than the back side. The light guide can include means for extracting light positioned along the length of the light guide. The light extracting means can be configured to direct light out of the light guide through the output surface. The light guide can include means for partially collimating light directed out of the output surface.

The light extracting means can include light extraction elements. The means for partially collimating light can include one or more tapered side walls that extend from the output surface to the back side of the light guide. The means for partially collimating light can include at least one side wall with at least one of a tilted plane surface and a polynomially shaped surface.

The light extracting means can be located on the output surface of the light guide. A reflector can be located proximate the back side of the light guide. The light extracting means can be configured to turn incident light towards the reflector, and the reflector can be configured to redirect the turned light out of the output surface.

A longitudinal axis can extend along the length of the light guide, and the means for partially collimating light can be configured such that light that exits the output surface in a plane substantially orthogonal to the longitudinal axis is substantially confined to a range of output angles of about ±60° or less relative to a direction normal to the output surface.

Yet another innovative aspect of the subject matter described in this disclosure can be implemented in a method of making a light guide substantially having a shape of a bar with a length longer than a width. The method can include providing a material configured to propagate light therein. The material can be shaped to have an elongate output surface, an elongate back side opposite the output surface, and one or more tapered side walls that extend from the output surface to the back side. The output surface can be wider than the back side. The tapered side walls can be configured to partially collimate light directed out of the output surface. The method can include providing light extraction elements along the length of the light guide. The light extraction elements can be configured to direct light out of the light guide through the output surface.

Providing the light extraction elements can include forming the light extraction elements on the output surface of the light guide. The method can further include providing a reflector proximate the back side of the light guide. The light extraction elements can be configured to turn incident light towards the reflector, and the reflector can be configured to redirect the turned light out of the output surface.

The method can include coupling a light source to the light guide to direct light into the light guide through a first end surface of the light guide, which can extend between the output surface, the back side, and the side walls.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
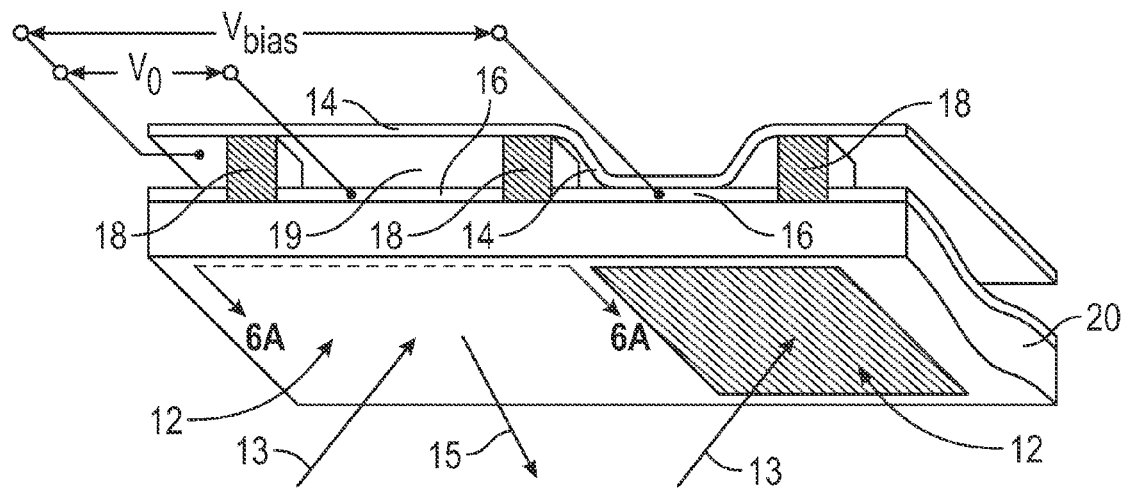
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, and electronic test equipment. Thus, the teachings are not intended to be limited to the implementations depicted solely in the Figures, but instead have wide applicability as will be readily apparent to a person having ordinary skill in the art.

A light guide bar can be configured to propagate light (e.g., by total internal reflection) received from a light source. The light guide bar can include light extraction elements that are configured to redirect light out of the light guide bar through an output surface, and the light guide bar can be configured to at least partially collimate the light exiting the output surface of the light guide bar. For example, the output surface of the light guide bar can be wider than a back side of the light guide bar, and tapered side walls can extend between the output surface and the back side. The tapered side walls of the light guide bar can be configured to receive the light redirected (e.g., scattered and or reflected) by the light extraction elements and at least partially collimate the light towards the output surface. The shape of the light guide bar and the location and configuration of the light extraction elements can be configured in various different manners to distribute light out of the light guide bar as appropriate for various particular lighting applications. The light guide bar designs disclosed herein can provide flexibility in distributing light for various illumination systems such as those used for illuminating a display device, or for illuminating a room or task area. For example, some display devices utilize ambient light for illumination, and in dark or low-light environments, ambient light may be insufficient or non-existent. An illumination system can be used to illuminate a display device, for example as a back light or a front light. In some implementations, one or more light guide bars can be edge-illuminated by one or more light sources (e.g., light emitting diodes (LEDs)) and the light guide bars can be configured to distribute the light to provide light to the display elements of a display device. In some other implementations, a light guide plate can be edge illuminated using a light guide bar that is configured to at least partially collimate light entering the light guide plate to improve the uniformity of distribution of light in the light guide plate and emitted therefrom to the display device. Also, by at least partially collimating the light that enters the light guide plate, the amount of light that experiences TIR in the light guide plate can be increased, thereby increasing the brightness of the display device. In some other implementations, illumination systems include one or more light guide bars may be used to provide general lighting of spaces and objects, such as architectural lighting or illumination of rooms or task areas.

Particular implementations of the subject matter described in this disclosure can be implemented to realize one or more of the following potential advantages. For example, use of a light guide bar configured to at least partially collimate the light input into a light guide plate of a display device can increase the uniformity of light used to illuminate the display device and can increase the brightness of the display device. Also, using a light guide bar to direct light from the light source(s) to the light guide plate can reduce the number of light sources used to illuminate the display device, while also providing generally uniform distribution of light from a single light source, or a small number of light sources. Also, light guide bars disclosed herein can be used for illumination in a room or task area and can be used to provide flexibility in designing lighting systems with various types of light distribution (e.g., uniform distribution, or focused task lighting, or more complex patterns) using a relatively small number of light sources. For example, multiple light guide bars can be arrayed together to provide uniform overhead lighting for rooms. As another example, light guide bars can be embedded or otherwise integrated into functional ceiling materials or ceiling material composites so as to result in more unobtrusive illumination sources of directional downlighting.

An example of a suitable MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when actuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows indicating light 13 incident upon the pixels 12, and light 15 reflecting from the pixel 12 on the left. Although not illustrated in detail, it will be understood by a person having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the pixel 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the pixel 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated pixel 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
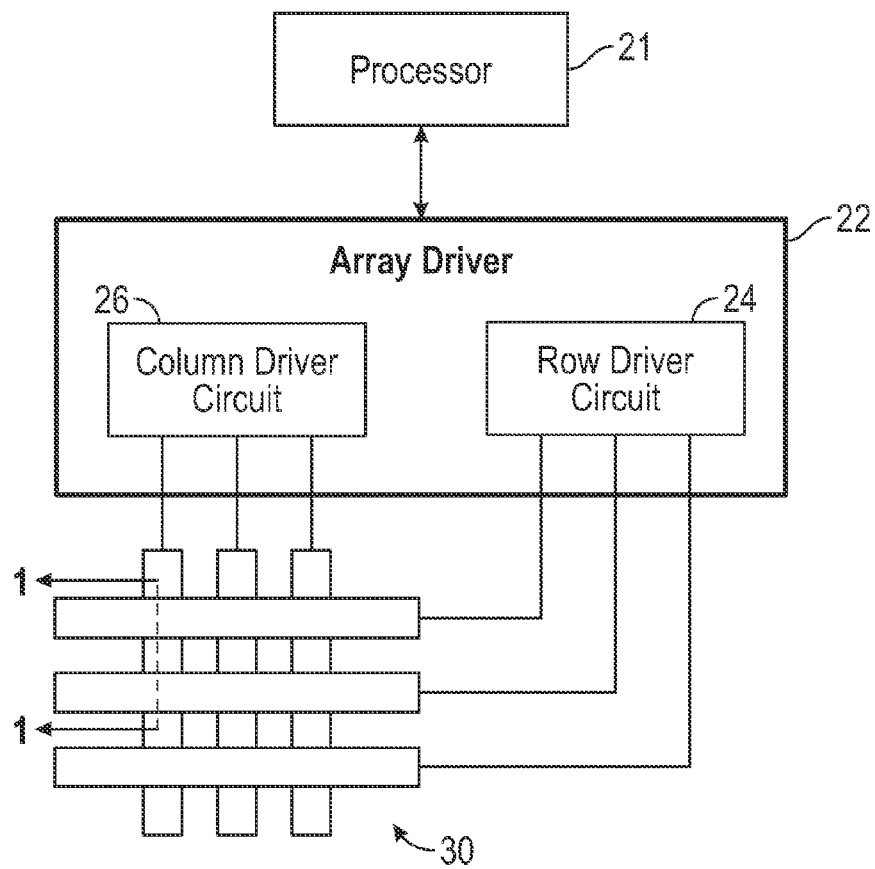
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or any other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
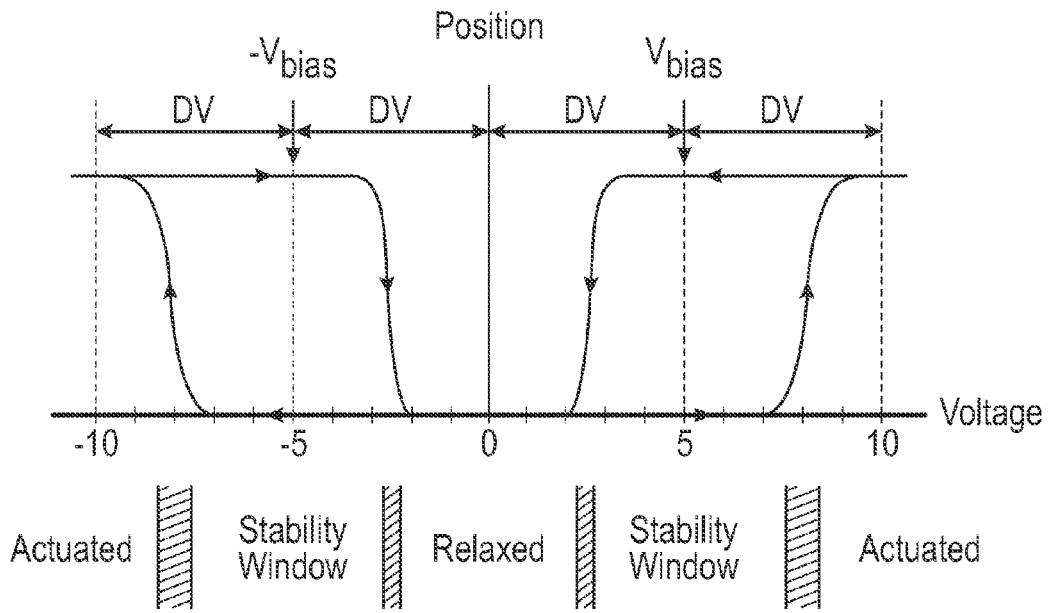
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10-volts, however, the movable reflective layer does not relax completely until the voltage drops below 2-volts. Thus, a range of voltage, approximately 3 to 7-volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10-volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7-volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
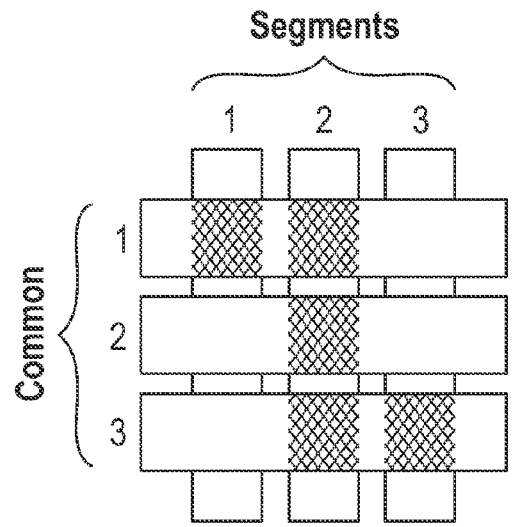
FIG. 5A shows an example of a diagram illustrating a frame of display data in the 3×3 interferometric modulator display of FIG. 2.
Figure 5B:
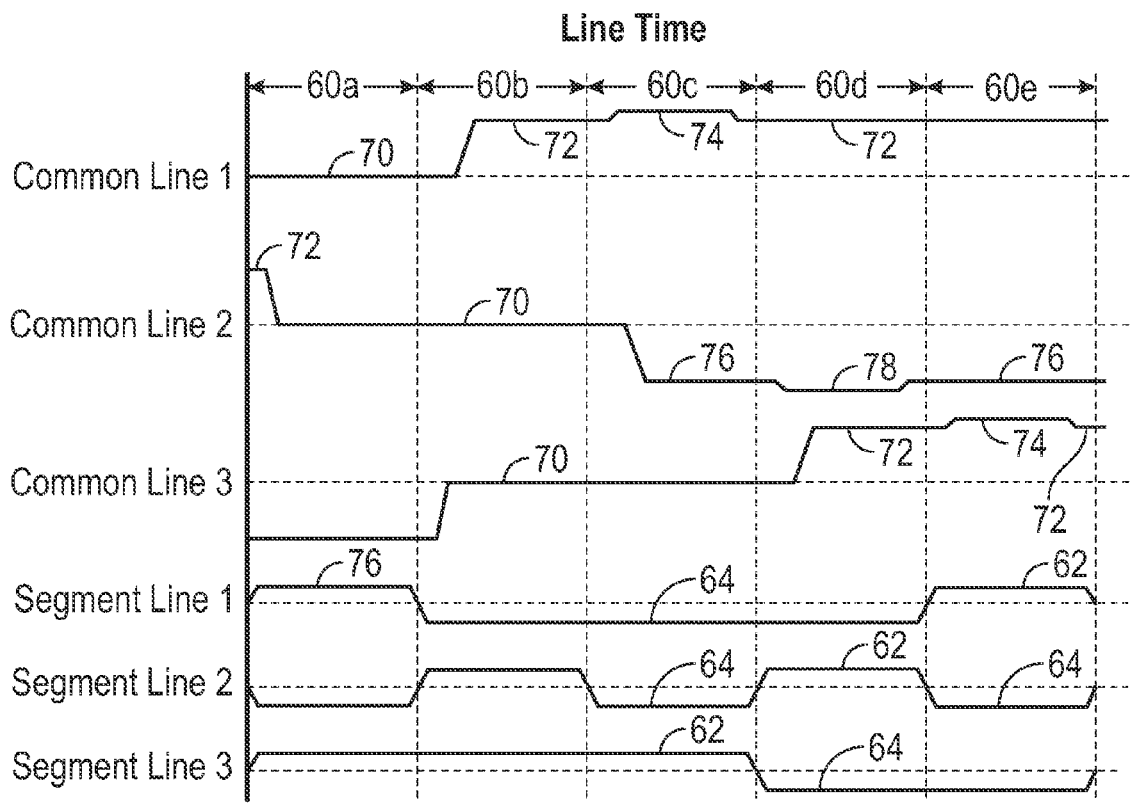
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a: a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
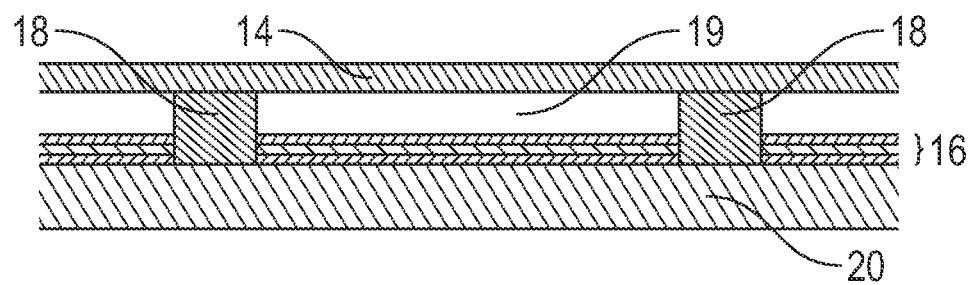
FIG. 6A shows an example of a partial cross-section of the interferometric modulator display of FIG. 1.
Figure 6B:
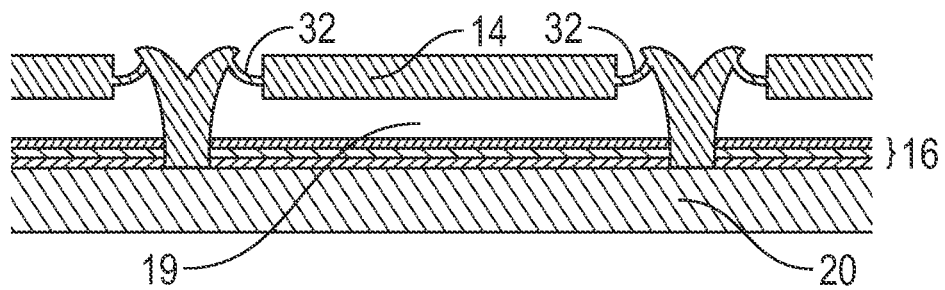
FIGS. 6B-6E show examples of cross-sections of varying implementations of interferometric modulators.
Figure 6C:
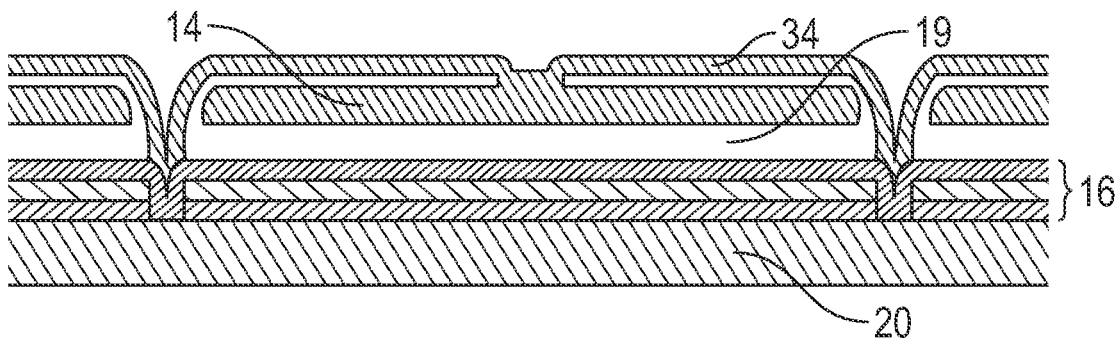

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
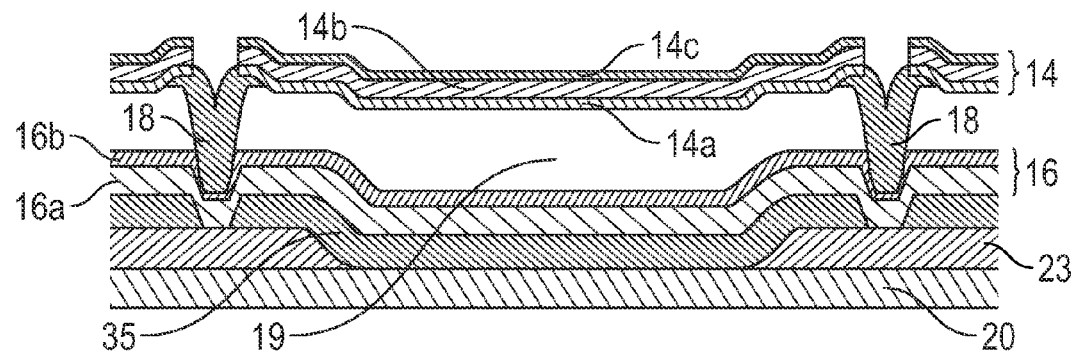

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2/SiON/SiI_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, a layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoride ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
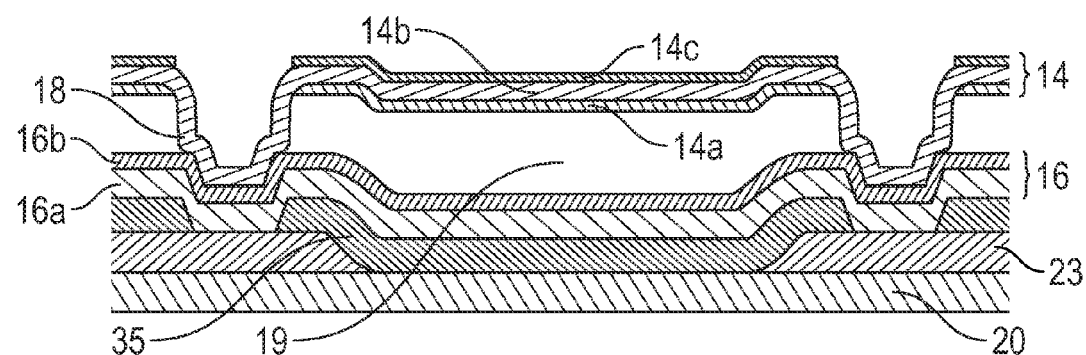

FIG. 6E shows another example of an IMOD, where the movable reflective layer 14 is self supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
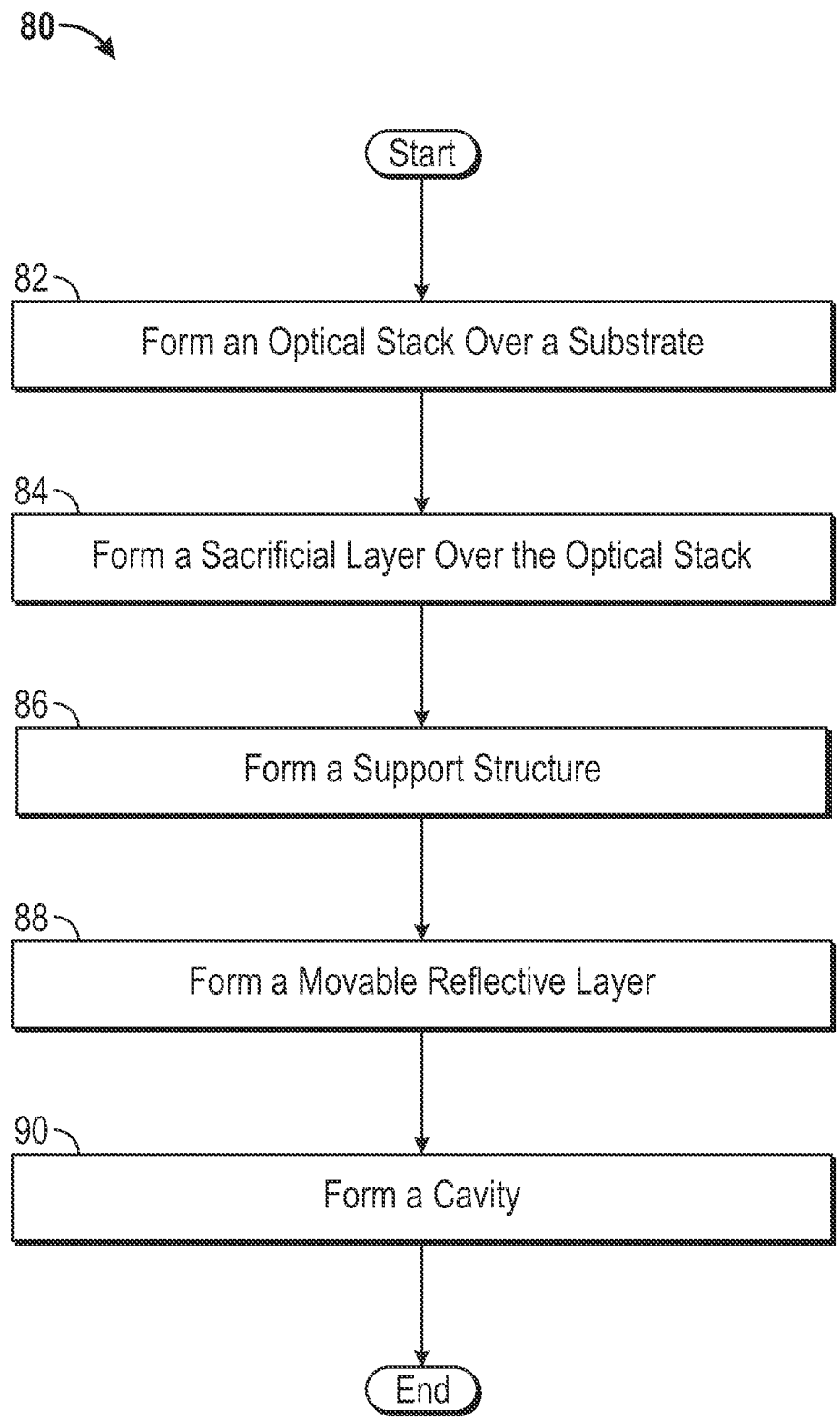
FIG. 7 shows an example of a flow diagram illustrating a manufacturing process for an interferometric modulator.
Figure 8A:
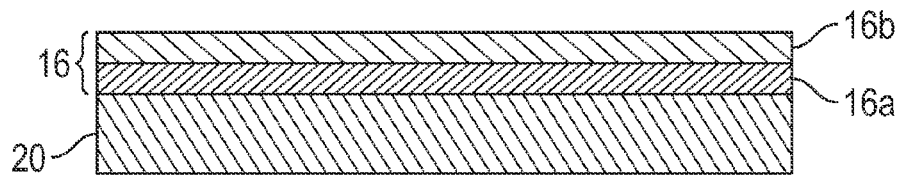
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
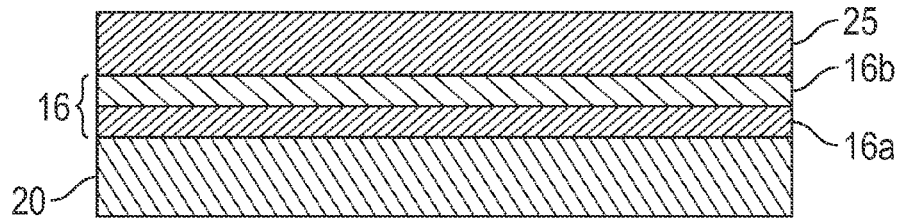

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (a-Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
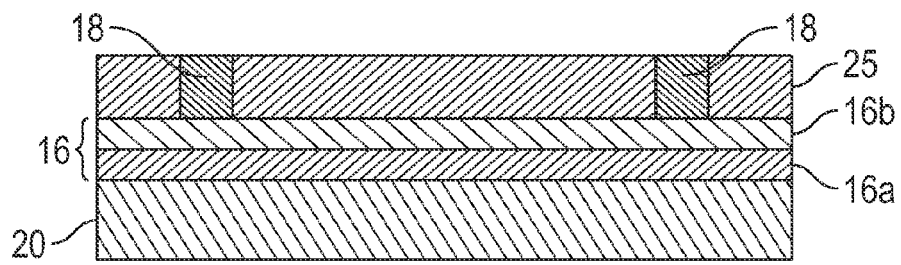

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
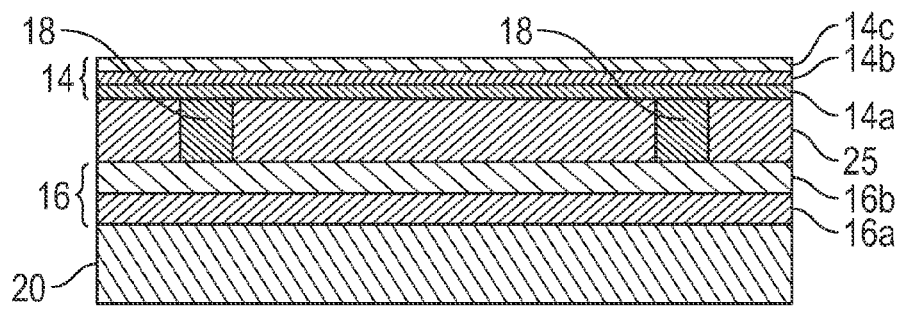
Figure 8E:
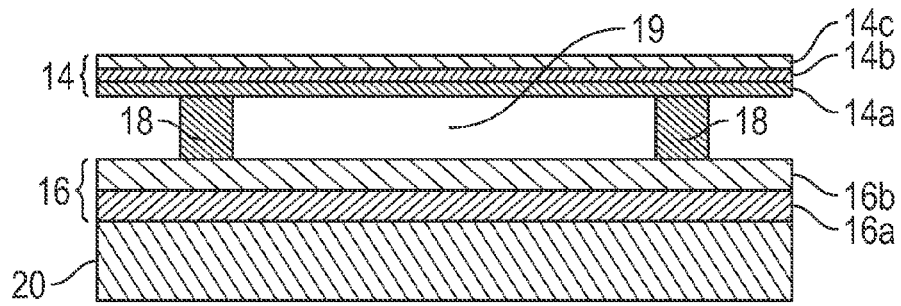

The process 80 continues at block 88 with the formation of a movable reflective layer or membrane such as the movable reflective layer 14 illustrated in FIGS. 1, 6 and 8D. The movable reflective layer 14 may be formed by employing one or more deposition steps, e.g., reflective layer (e.g., aluminum, aluminum alloy) deposition, along with one or more patterning, masking, and/or etching steps. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 may also be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

Figure 9:
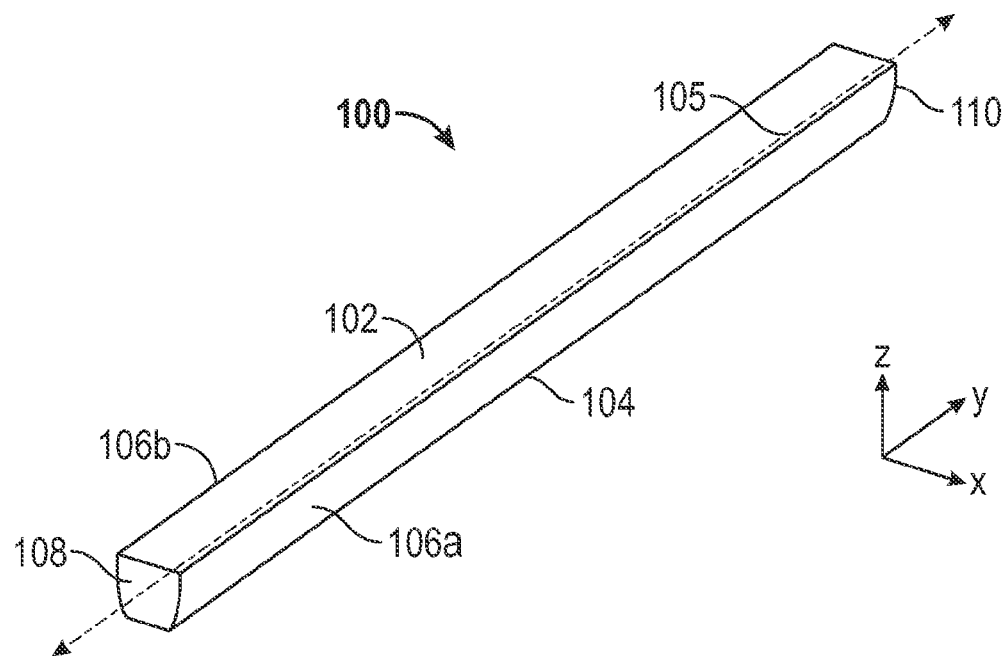
FIG. 9 shows an example of a top isometric view of a light guide bar.
Figure 10:
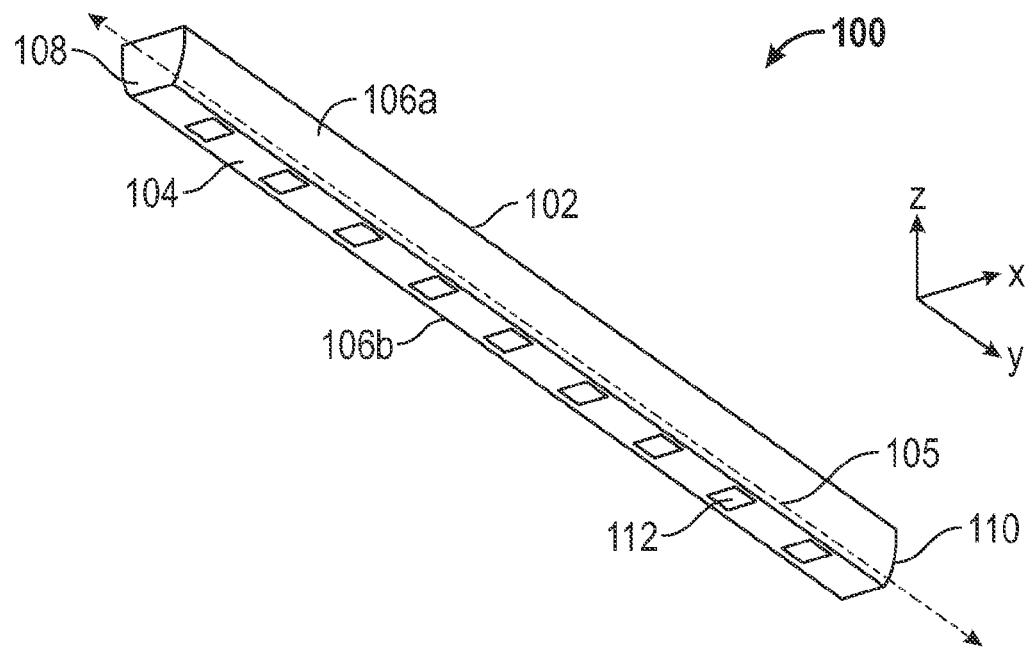
FIG. 10 shows an example of a bottom isometric view of the light guide bar of FIG. 9.

FIG. 9 shows an example of a top isometric view of a light guide bar. FIG. 10 shows an example of a bottom isometric view of the light guide bar of FIG. 9. The light guide bar 100 can have the shape of a bar extending along a longitudinal axis 105 (which is parallel to the y-axis in FIGS. 9 and 10). The length of the light guide bar 100 extending along the longitudinal axis 105 can be greater than the width of the light guide bar 100 extending transverse to the longitudinal axis 105. For example, the length of the light guide bar 100 can be at least about 20 times greater than the width, with the maximum length determined by the constraints of the intended application and limited only by the absorptiveness of the bar material, although other configurations outside of these ranges can also be used. The light guide bar 100 can include one or more solid materials configured to propagate light therein (e.g., by reflection, such as by total internal reflection (TIR), and/or reflection off a reflective coating provided on the surfaces of the light guide bar 100). In various implementations, the light guide bar 100 can be formed of one or more of the following materials: glasses, acrylics, acrylate copolymers, UV-curable resins, polycarbonates, cycloolefin polymers, polymers, organic materials, inorganic materials, silicates, alumina, sapphire, glasses, polyethylene terephthalate ("PET"), polyethylene terephthalate glycol ("PET-G"), silicon oxy-nitride, and/or other optically transparent materials. The light guide bar 100 can have an output surface 102, which can be an elongate surface that extends along at least a portion of the longitudinal axis 105. The light guide bar 100 can have an elongate back side 104, which can extend along the longitudinal axis 105 facing and opposite the output surface 102. The output surface 102 can be wider (e.g., in the x-direction of FIGS. 9 and 10) than the back side 104. For example, the output surface 102 can be at least about 30%, or about 45% wider and/or no more than about 60% wider than the back side 104, although other configurations outside of these ranges can also be used. As shown in FIGS. 9 and 10, the back side 104 can include a surface that is substantially parallel to the output surface 102 and is positioned opposite the output surface 102.

The light guide bar 100 can include light extraction elements that are configured to redirect light, which is propagating along the longitudinal axis 105, out of the light guide bar 100. As can be seen in FIG. 10, for example, the back side 104 of the light guide bar 100 can include one or more light extraction elements, which take the form of light scattering features 112 in some implementations. In some implementations, the light scattering features 112 can be, for example, rough or irregular areas on the surface of the light guide bar 100 (e.g., areas formed by grinding), such that light that strikes the light extraction elements is scattered instead of being propagated through the light guide bar 100 (e.g., by TIR). The light extraction elements (e.g., the light scattering features 112) can be configured to direct light out of the light guide bar 100 (e.g., through the output surface 102). The light extraction elements 112 can be dispersed along the length of the light guide bar 100. As shown in FIG. 10, the light scattering features 112 can be substantially evenly distributed along the longitudinal axis 105. Other distributions of light extraction elements 112 are possible to achieve various different types of light distributions for various different lighting applications.

The light guide bar 100 can include one or more tapered side walls 106a and 106b that extend from the output surface 102 to the back side 104 of the light guide bar 100. The right tapered side wall 106a and/or the left tapered side wall 106b can be shaped and angled to at least partially collimate the light that is directed out of the output surface.

With continued reference to FIGS. 9 and 10, the light guide bar 100 can include a first end 108, which can extend between the edges of the output surface 102, the back side 104, and the side walls 106a and 106b. The first end 108 can have a surface, through which longitudinal axis 105 can extend. In some implementations, a line normal to the first end surface 108 can be about parallel with the longitudinal axis 105 (e.g., the y-axis). The light guide bar 100 can include a second end 110, which can extend between the edges of the output surface 102, the back side 104, and the side walls 106a and 106b, and can be positioned opposite the first end 108. The second end 110 can have a surface, through which the longitudinal axis 105 can also extend. In some implementations, a line normal to the second end surface 110 can be about parallel with the longitudinal axis 105 (e.g., the y-axis).

Many variations to the design of the light guide bar 100 are possible for providing various distributions of light from the light guide bar 100. For example, the output surface 102 shown in FIGS. 9 and 10 can be parallel to the x-y plane and extend along substantially the full length of the light guide bar 100. In some implementations, the output surface 102 can extend only along a portion of the length of the light guide bar 100, and in some implementations, multiple spaced-apart output surfaces 102 can be used. In some implementations, the output surface 102 can extend along a first portion of the light guide bar 100 and can face in a first direction (e.g., in the z-direction, such that a line normal to the output surface is parallel to the z-axis), and a second output surface can extend along a second portion of the light guide bar 100 and can face in a second direction (e.g., in the x-direction, such that a line normal to the output surface is parallel to the x-axis). Other implementations can include 3, 4, 5, or more output surfaces facing in different directions at different portions along the length of the light guide bar 100.

Figure 11A:
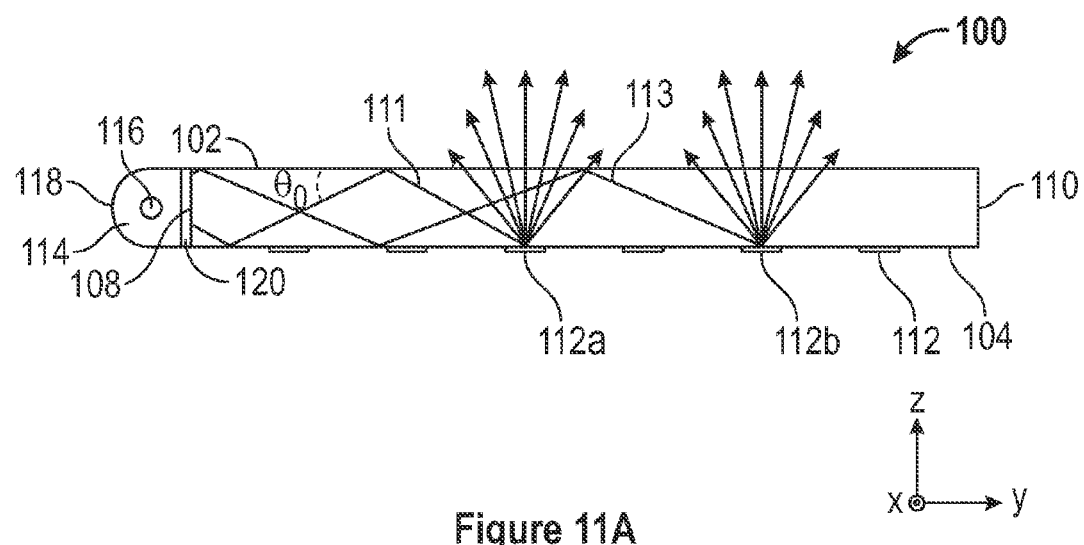
FIG. 11A shows an example of a cross-sectional view of a light guide bar similar to the light guide bar of FIG. 9, with the cross-section taken in the yz-plane.

FIG. 11A shows an example of a cross-sectional view of a light guide bar similar to the light guide bar of FIG. 9, with the cross-section taken in the yz-plane. The light guide bar 100 can include a light source 114 configured to direct light into the light guide bar 100 through the first end 108 thereof. Various types of light sources can be used, such as, for example, a light emitting diode (LED), an organic light emitting diode (OLED), a filament lamp, a fluorescent lamp, etc. In some implementations, as shown in FIG. 11A, the light source 114 can include a light emitter 116 (e.g., a LED) oriented so that light emitted from the light source 114 is directed towards the first end 108, or input surface, of the light guide bar 100. In some implementations, a reflector 118, or other optical element, can be configured to direct, focus, or partially collimate light from the light source 114. In some implementations, multiple light sources of different colors can be used, which can combine to provide white, or substantially white, light. In some implementations, to form the light source 114, a blue LED can be used (e.g., a Citizen CL-435S LED) with a yellow or yellow-green phosphor 120 to produce white, or substantially white light.

Figure 11B:
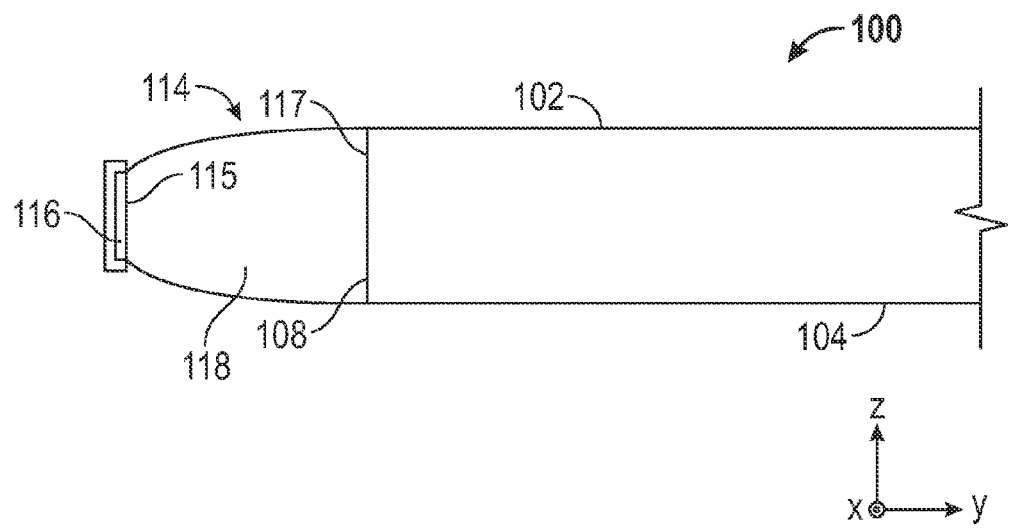
FIG. 11B shows an example cross-sectional view of a light guide bar and a collimating reflector configured to input light into the light guide bar, with the cross-section taken in the yz-plane.

FIG. 11B shows an example cross-sectional view of a light guide bar and a collimating reflector configured to input light into the light guide bar, with the cross-section taken in the yz-plane. In some implementations, the light source 114 can include a plane light emitter 116, such as a LED chip, a phosphor coated blue LED, a plurality of LED chips that combine to produce white, or substantially white, light (e.g., a quad of LED chips, such as R, G, G, B). The light emitter 116 can be optically coupled to an input aperture 115 of a collimating reflector 118. In some implementations, the light emitting surface of the plane light emitter 116 can fill or substantially fill the input aperture 115 of the collimating reflector 118. An output aperture 117 of the collimating reflector 118 can be optically coupled to the light guide bar 100 (e.g., to the first end 108 thereof), so that the collimating reflector 118 can be configured to substantially preserve etendue of the light emitted by the plane light emitter 116 and input into the light guide bar 100. For example, the shape of the collimating reflector can be governed by Sine Law reflector design, as described below.

Figure 11C:
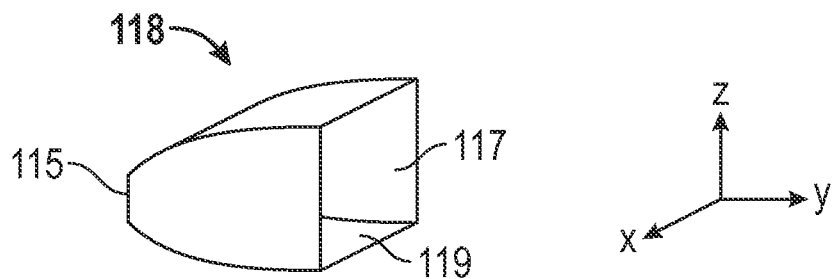
FIG. 11C shows an example of an isometric view of a collimating reflector.
Figure 11D:
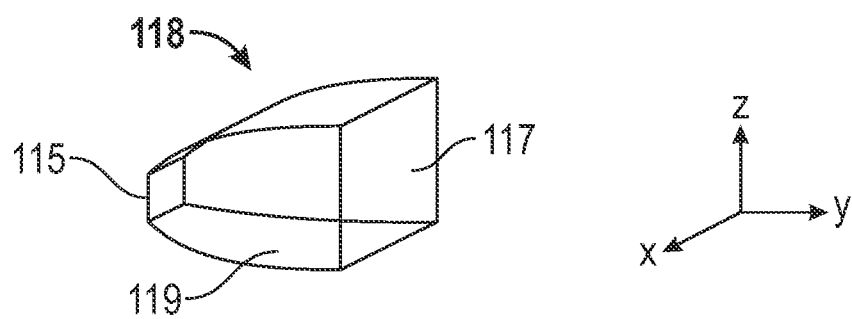
FIG. 11D shows an example of an isometric view of another collimating reflector.

FIG. 11C shows an example of an isometric view of a collimating reflector. The collimating reflector 118 can have side walls 119 that are mathematically shaped according to Sine Law reflector design, as discussed below. The side walls 119 can include a reflective material (e.g., metal) or coating on the inner surfaces thereof, such that the side walls 119 can reflect light that impinges on the inner surfaces of the side walls 119 as the light propagates from the input aperture 115 to the output aperture 117. In some other implementations, reflection can occur by total internal reflection. The space between the side walls 119 can be open space (e.g., filled with air), or can be filled with a substantially transparent material (e.g., glass or plastic). FIG. 11D shows an example of an isometric view of another collimating reflector. The collimating reflector 118 can be formed from a substantially transparent material (e.g., glass or plastic), and can be configured to reflect light by total internal reflection. The side walls 119 can be formed by the sides of the substantially transparent material, as shown in FIG. 11D. In some implementations, a reflective coating can be applied to at least a portion of the outside of the side walls 119 show in FIG. 11D.

Figure 11E:
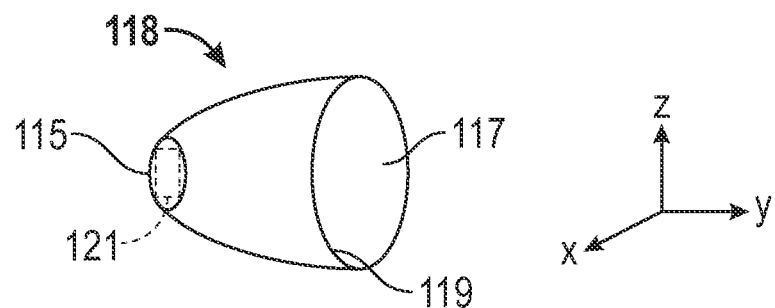
FIG. 11E shows an example of an isometric view of another collimating reflector.

FIG. 11E shows an example of an isometric view of another collimating reflector. The collimating reflector 118 can have a variety of cross-sectional shapes. For example, the input aperture 115 and/or the output aperture 117 can have a generally circular (or elliptical) shape as shown in FIG. 11E. The side walls 119 extending between the input aperture 115 and the output aperture 117 can form a shape that is similar to the shape of the input aperture 115 and/or the shape of the output aperture 117 (e.g., a circle or ellipse as shown in FIG. 11E). Other configurations are possible. For example, the input aperture 115 and/or the output aperture 117 can have square or rectangular (or generally square or generally rectangular) shape, as shown in FIGS. 11C and 11D. In some implementations, the light emitting surface (shown in FIG. 11E by dotted line 121) of the plane light emitter 116 can fill less than the full input aperture 115. For example, as shown in FIG. 11E, the input aperture 115 can have a generally circular shape, and the light emitting surface 121 can have a generally square shape. The light emitting surface 121 can fill at least about 50%, 70%, 80%, 90%, 95%, 97%, 99%, or more of the input aperture 115. In some implementations, a light emitting surface 121 can be used that has substantially the largest area that fits within the input aperture 115. In some implementations, the shape of the light emitting surface 121 of the plane light emitter 116 can be similar to the shape of the input aperture 115 so that the light emitting surface 121 can fill, or substantially fill, the input aperture 115.

Figure 11F:
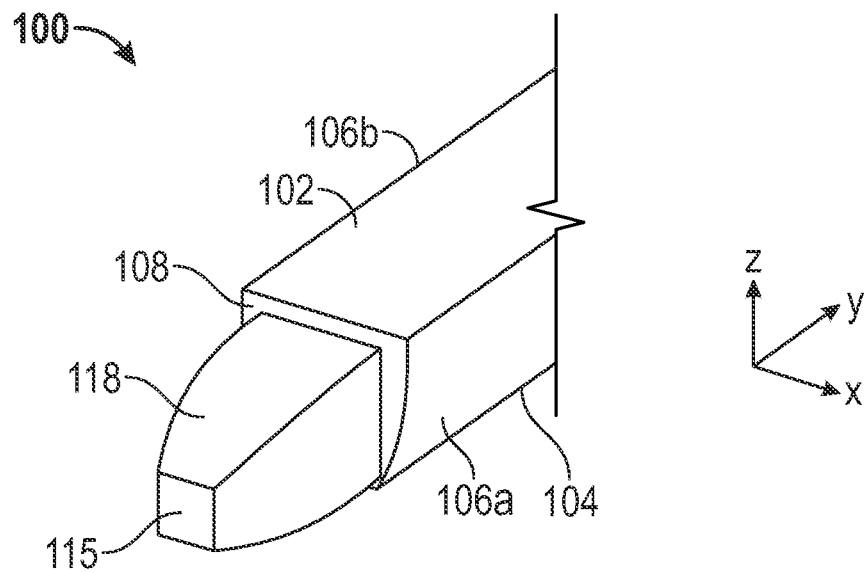
FIG. 11F shows an example of an isometric view of the end of a light guide bar and a collimating reflector configured to input light into the light guide bar.
Figure 11G:
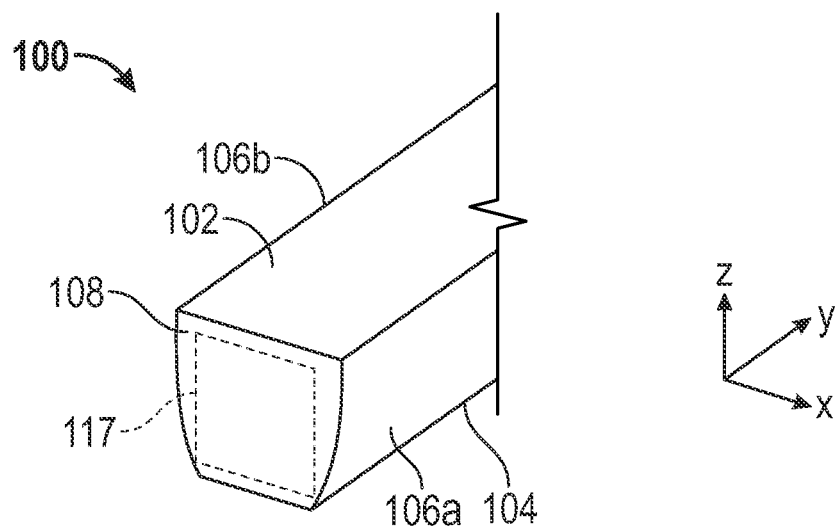
FIG. 11G shows an example of an isometric view of the end of a light guide bar and showing an input area that corresponds to an output aperture of a collimating reflector.

FIG. 11F shows an example of an isometric view of the end of a light guide bar and a collimating reflector configured to input light into the light guide bar. FIG. 11G shows an example of an isometric view of the end of a light guide bar that shows an input area corresponding to an output aperture of a collimating reflector. The output aperture 117 (show by a dotted line in FIG. 11G) of the collimating reflector 118 can be optically coupled to the light guide bar 100 (e.g., to the first end 108 thereof). The output aperture 117 of the collimating reflector 118 can fill at least about 50%, 70%, 80%, 90%, 95%, 97%, 99%, or more of the area of the input end 108 of the light guide bar 100. In some implementations, the output aperture 117 can be sized to have substantially the largest area that fits within the area of the input end 108 (given the different shapes of the output aperture 117 and the input end 108). In some implementations, the output aperture 117 can have a shape similar to the shape of the input end 108 of the light guide bar 100, and the output aperture 117 can fill, or substantially fill the input end 108 of the light guide bar 100. In some implementations, the collimating reflector 118 can be configured to collimate substantially all the light input into the light guide bar 100 to within a distribution angle that causes the light to be guided within the light guide bar 100 by total internal reflection, which can prevent light from leaking out of the light guide bar 100 before being redirected (e.g., by scattering features 112 or facets 124).

In some implementations, the collimator 118 is configured to redirect light from the light emitter 116 so that the light propagates with a limited dispersion in one plane (for example, the xy-plane), while having a relatively wide dispersion in another plane (for example, the yz-plane). In some other implementations, the collimator 118 is configured to redirect light from the light emitter 116 so that the light propagates with a limited dispersion in two planes (for example the xy- and yz-planes). Thus, the dispersion of light entering the light guide bar 100 is narrower with the collimator 118 than without the collimator 118.

With reference again to FIG. 11A, light from the light source 114 can enter the light guide bar 100 and impinge on the surfaces of the light guide bar 100 at angles that are below a critical angle $\theta_0$ (measured from parallel to the surface as shown in FIG. 11A) for propagation of light in the light guide bar 100 by TIR. In some implementations, the reflector 118, or other optical elements in the light source 114, can direct the light so that most, or all, or substantially all the light entering the light guide bar 100 has an angle less than the critical angle $\theta_0$ and can experience TIR in the light guide bar 100. The light guide bar 100 can include a plurality of scattering features 112. The scattering features 112 can be positioned on the back side 104 of the light guide bar 100 so that the scattered light is directed towards the output surface 102 and at least a portion of the scattered light exits the light guide bar 100 through the output surface 102.

As can be seen in FIG. 11A, a first example ray of light 111 enters the light guide bar 100 through the input surface 108 and propagates through the light guide bar 100 by TIR until the light 111 strikes the first scattering feature 112a. The scattering feature 112a can be a rough or irregular surface that causes diffuse reflection or scattering of light 111 (e.g., causing an isotropic or Lambertian distribution). At least some of the scattered light propagates at an angle higher (steeper with respect to the output surface 100) than the critical angle $\theta_0$, thereby overcoming TIR and allowing the light to exit the light guide bar 100 through the output surface 102. In some implementations, a portion of the scattered light (not shown in FIG. 11A) is scattered at an angle that is below the critical angle $\theta_0$ so that a portion of the scattered light continues to propagate in the light guide bar 100 by TIR. A second example ray 113 in FIG. 11A enters the light guide bar 100 at a different angle or location so that the light propagates in the light guide bar 100 by TIR past the first scattering feature 112a until the light 113 strikes a second light scattering feature 112b that is further from the input surface 108 than is the first scattering features 112a. The light 113 can be scattered by the second scattering feature 112b in a manner similar to that described above for the first scattering feature 112a.

The light scattering features 112 can be arranged or distributed in various arrangements to allow flexibility in designing light guide bars for various types of light distribution. The light scattering features 112 can be substantially evenly distributed, as shown, for example, in FIG. 11A. Alternatively, the light scattering features 112 can be distributed to provide substantially even distribution of light from the output surface 102 (e.g., by concentrating more light scattering features 112 at portions further away from the input surface 108). Many other configurations are possible. For example, light scattering features 112 can be positioned only near the second end 110 of the light guide bar 100 so that light exits the light guide bar 100 substantially only near the second end 110.

Figure 12:
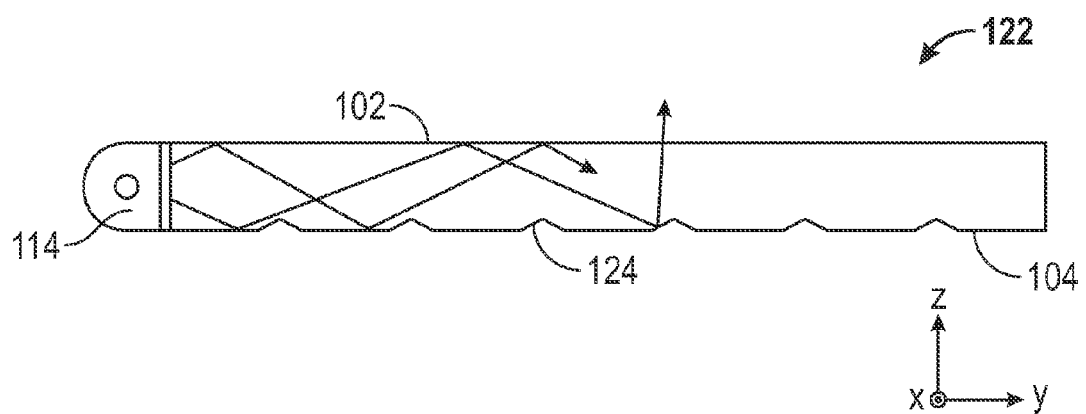
FIG. 12 shows an example of a cross-sectional view of another light guide bar in the yz-plane.

Various types of light extraction elements can be used to direct light out of the light guide bars disclosed herein. For example, although the discussion of FIGS. 9-11A mentions scattering features 112, various other light extraction elements can be used in place of, or in conjunction with the scattering features 112, to similarly direct light out of the light guide bar 100 through the output surface 102. For example, FIG. 12 shows an example of a cross-sectional view of another light guide bar in the yz-plane. The light guide bar 122 can include various features that are similar to, or the same as, the light guide bar 100 or various other light guide bars disclosed herein, and the corresponding disclosure relates to the light guide bar 122 even when not specifically discussed. The light guide bar 122 can include facets 124 that are configured to redirect light out of the light guide bar 100 through the output surface 102. The facets 124 can be reflective (e.g., by TIR and/or a reflective coating), and the facets 124 can include, for example, grooves, ridges, or pits (e.g., conical or frusta-conical). As with the other light extraction elements discussed herein, the facets 124 can be arranged in various configurations to provide different distributions of light. Facetted extractors (e.g., facets 124) can efficiently redirect guided light within predictable and angle controlled directions that predominantly bring about TIR failure and thereby allow substantially all redirected light to escape the light guide (for instance, the light guide bar 100) through the output surface 102, in some implementations. Scattering features 112 can redirect light into a substantially Lambertian, or similar, hemisphere, so that only a portion of the scattered light has an angle that overcomes TIR and exits the light guide bar 100 as output light through output surface 102. The remaining scattered light can propagate along the light guide bar 100 by TIR and would require additional scattering interaction to become part of the output. The use of scattering features 112 to redirect light out of the light guide bar 100 can result in greater light loss due to light absorption, as compared to the use of facets 124. In some cases, multiple scattering interactions are needed to produce the equivalent light output extraction to that produced by the use of facetted reflectors (e.g., facets 124), and light absorption can occur at each scattering interaction. Thus, in some implementations, facets 124 can provide greater efficiency as compared to scattering features 112. With reference to FIG. 12, in some implementations, the facets 124 can be distributed on the back side 104 of the light guide bar 100 so that light turned by the facets can be directed to the output surface.

Figure 13:
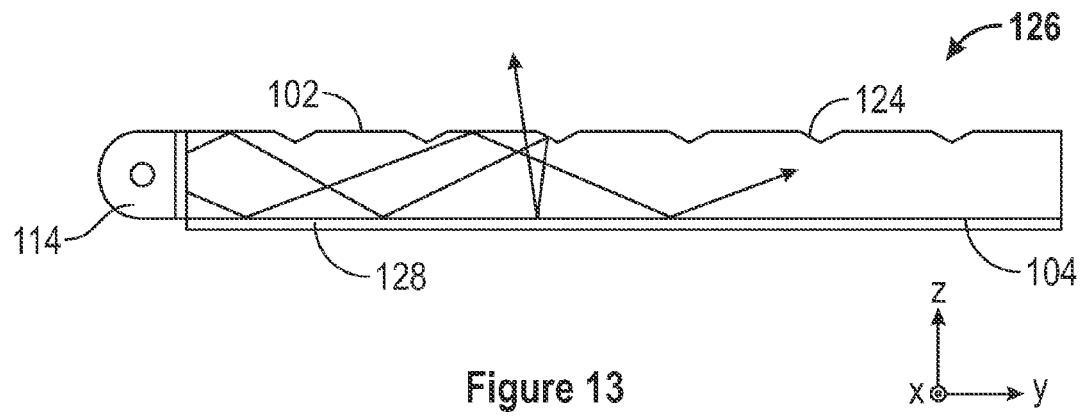
FIG. 13 shows an example of a cross-sectional view of another light guide bar in the yz-plane.

FIG. 13 shows an example of a cross-sectional view of another light guide bar in the yz-plane. With reference to FIG. 13, the facets 124 can be distributed along the output surface 102 of the light guide bar 100 so that light that is redirected by the facets 124 is turned towards the back side 104 of the light guide bar 100. A reflector 128 can be positioned at the back side 104 of the light guide bar 100 to redirect the turned light towards the output surface 102 so that the turned light exits the light guide bar 100 through the output surface 102. In some implementations, the reflector 128 can be adjacent to the back side 104 of the light guide bar 126. For example, the reflector 128 can be adhered to the back side 104 of the light guide bar 126. In some implementations, the reflector 128 can be a reflective coating. In some implementations, the reflector 128 can facilitate propagation of light through the light guide bar 126 in addition to, or instead of, TIR at the back side 104. The reflector 128 can provide generally specular reflection so that incoming light and reflected light have substantially the same angle with respect to the surface of the reflector 128.

Figure 14:
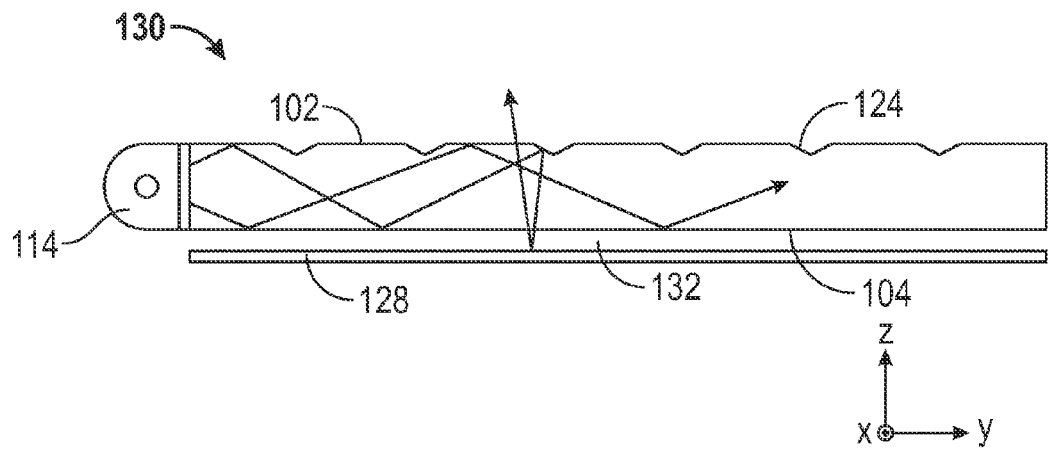
FIG. 14 shows an example of a cross-sectional view of another light guide bar in the yz-plane.

FIG. 14 shows an example of a cross-sectional view of another light guide bar in the yz-plane. As shown in FIG. 14, the reflector 128 can be spaced apart from the back side 104 of the light guide bar 130, providing a gap 132 between the reflector 128 and the light guide bar 130. The gap 132 can include air or some other material having an index of refraction lower than that of the material of the light guide bar 130, so that light can experience TIR at the back side 104 of the light guide bar 130. Light that overcomes TIR and exits the back side 104 of the light guide bar 130 can be redirected towards the output surface 102 by the reflector 128. The reflector 128 can provide generally specular reflection in some implementations, and in some other implementations, the reflector 128 can provide diffuse reflection which can at least partially scatter the light reflected by the reflector 128. The diffuse reflection can increase the uniformity of the distribution of light provided by the light guide bar 130. The diffuse reflector 128 can be spaced apart from the light guide bar 130 by the gap 132, so that the diffuse reflector 128 does not interfere with propagation of light along the light guide bar 130 (e.g., by TIR). One or more posts (not shown in FIG. 14) can be used to suspend the reflector 128 apart from the back side 104 of the light guide bar 130. In some implementations, a layer of solid material (e.g., having a lower index of refraction than the material of the light guide bar 130) can be deposited, or otherwise positioned, between the light guide bar 130 and the reflector 128. For example, the solid material may be an adhesive.

Figure 15:
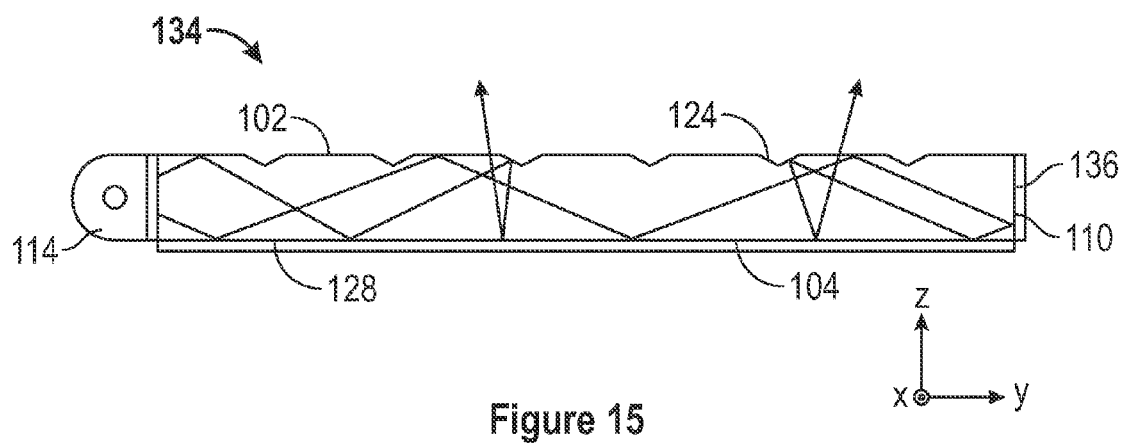
FIG. 15 shows an example of a cross-sectional view of another light guide bar in the yz-plane.

FIG. 15 shows an example of a cross-sectional view of another light guide bar in the yz-plane. As shown in FIG. 15, an end reflector 136 can be positioned at the second end 110 of the light guide bar 134. The end reflector 136 can reflect light that propagates through the light guide bar 134 to the second end 110 of the light guide bar 134. Thus, light that reaches the second end 110 of the light guide bar 134 can be redirected to propagate in the light guide bar 134 back towards the first end 108. This can prevent the loss of the light, if any, that is able to propagate to the second end 110 of the light guide bar 134 without being redirected out of the light guide bar 134, thereby increasing the brightness of the illumination provided by the light guide bar 134, and increasing the efficiency of the lighting system as well. The reflector 136 can be adjacent the second end 110 of the light guide bar 134 (as shown in FIG. 15), or the reflector 136 can be spaced apart from the second end 110 of the light guide bar 134 providing a gap therebetween (similar to the reflector 128 of FIG. 14). The end reflector 136 can be used with or without the reflector 128. In some implementations, the reflector 128 and the end reflector 136 can be incorporated into a single continuous reflector structure that has a turned or angled portion that forms the end reflector 136.

Many combinations, subcombinations, and variations can be made from the implementations of FIGS. 11-15. For example, in FIGS. 12-15, light scattering features 112 can be used in addition to, or in place of, the light turning facets 124 shown, and light turning facets 124 can be used in addition to, or in place of, the light scattering features shown in FIG. 11A. In some implementations, other light extraction elements (e.g., as part of a holographic film or a prismatic film) can be used in addition to, or in place of, the light scattering features 112 and/or the light turning facets 124.

Figure 16:
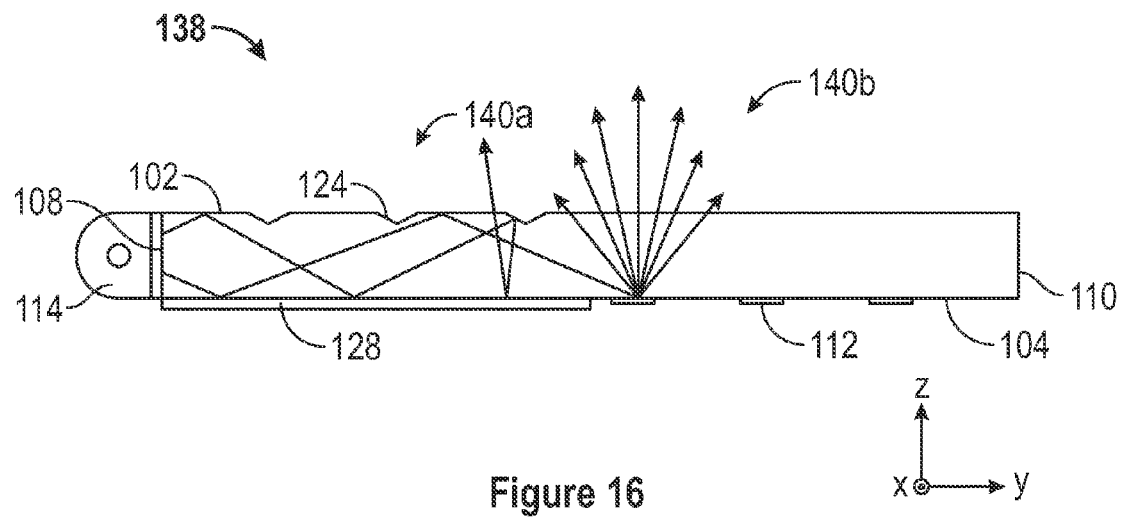
FIG. 16 shows an example of a cross-sectional view of another light guide bar in the yz-plane.

FIG. 16 shows an example of a cross-sectional view of another light guide bar in the yz-plane. The light guide bar 138 can have different types of light extraction elements at different portions of the light guide bar 138. For example, at a first portion 140a of the light guide bar 138 (e.g., extending from the first end 108 to about a midpoint along the length of the light guide bar 138) can have light turning facets 124, and a second portion 140b of the light guide bar 138 (e.g., extending from about a midpoint of the light guide bar 138 to the second end 110 thereof) can have light scattering features 112. Different portions of the light guide bar 138 can have other differences as well. For example, the first portion 140a can have the light extraction elements (e.g., light turning facets 124 (as shown in FIG. 16) or light scattering features) on the side of the output surface 102, and the second portion 140b can have the light extraction elements (e.g., light scattering features 112 (as shown in FIG. 16) or light turning facets) on the back side 104 of the light guide bar 138. A reflector 128 can extend along the portion of the light guide bar 138 having light extraction elements on the side of the output surface 102. Also, in various implementations disclosed herein, the light guide bar 138 can be illuminated using two light sources, with a first light source 114 positioned at the first end 108 and the second light source (not shown) positioned at the second end 110 of the light guide bar 138.

Figure 17:
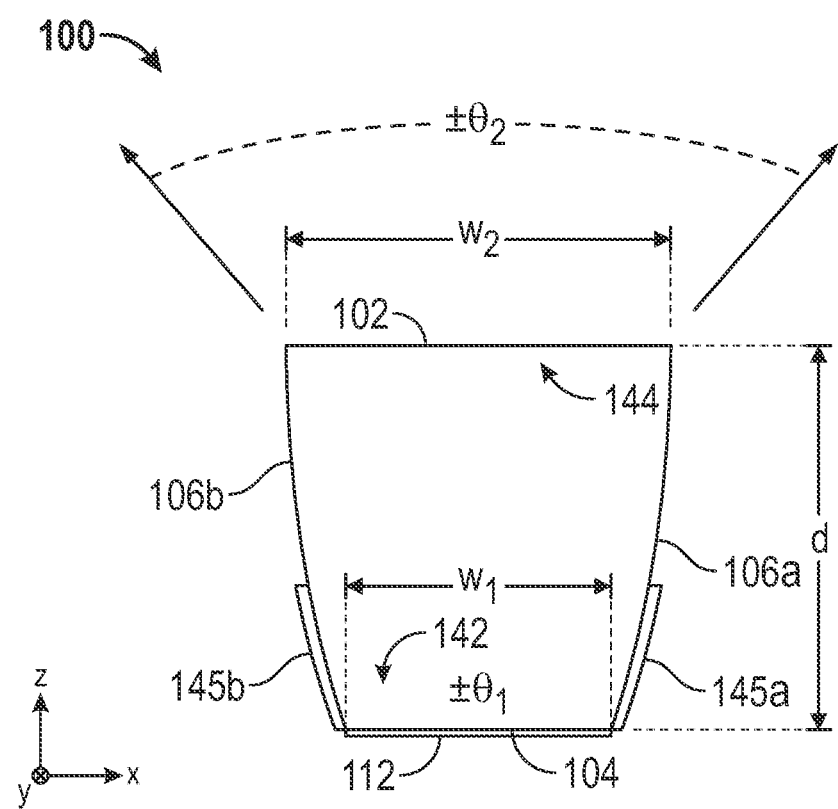
FIG. 17 shows an example of a cross-sectional view of the light guide bar of FIG. 9 in the xz-plane.

FIG. 17 shows an example of a cross-sectional view of the light guide bar of FIG. 9 in the xz-plane. The output surface 102 can be wider (in the x-direction) than the back side 104 of the light guide bar 100, so that the side walls 106a and 106b are tapered between the output surface 102 and the back side 104. The side walls 106a and 106b can be configured to at least partially collimate light that is output from the output surface 102 (e.g., light scattered by a light scattering feature 112 or other light extraction element). The side walls 106a and 106b can be configured to at least partially collimate light in a single plane of collimation (e.g., the xz-plane), while providing less or no light collimation for light propagating in planes (e.g., the yz-plane or xy-plane) orthogonal to the plane of collimation. Thus, output light that propagates in the plane of collimation (the xz-plane) can be turned to increase the z-direction component of the direction of travel for the output light. The side walls 106a and 106b can decrease divergence of the light away from the yz-plane, thereby collimating the light towards the yz-plane. Light propagating in the yz-plane (orthogonal to the plane of collimation (the xz-plane)) can exit the light guide bar 100 without contacting the side walls 106a and 106b, so that the side walls 106a and 106b do not partially collimate light propagating in the yz-plane. In some implementations, the side walls 106a and 106b can thereby provide substantially no collimation in any plane orthogonal to the plane of collimation (the xz-plane). In some implementations, the side walls 106a and 106b can at least partially collimate light in the intended plane of collimation (the xz-plane) more than in any other plane or direction. In some implementations, the distribution of light exiting the output surface 102 can have greater positive optical power in the xz-plane to decrease divergence of light propagating parallel to the xz-plane, and configured to have less optical power in the yz-plane.

In some implementations, the light scattered by the scattering features 112 can be distributed across a distribution angle $\pm\theta_1$ of about $\pm 90°$ (e.g., classical Lambertian distribution). The side walls 106a and 106b can be configured to partially collimate light in the xz-plane to a distribution angle of $\pm\theta_2$, which can allow all, or substantially all, of the redirected light propagating in the xz-plane to overcome TIR and exit the light guide bar 100 (e.g., through the output surface 102). For example, the side walls 106a and 106b can be configured to partially collimate light in the xz-plane such that light exiting the output surface 102 in the xz-plane has an emission distribution $\pm\theta_2$ that can range from a maximum divergence of about $\pm 60°$ to a minimum divergence of about $\pm 20°$, including all other angular ranges in between. The range of angles $\pm\theta_2$ can be centered on a normal to the output surface 102. In some implementations, the at least partially collimated light can have a substantially sharp cutoff at the ends of the emission distribution, as opposed to a soft, gradual fade (e.g., as in Lambertian distribution). By at least partially collimating the redirected (e.g., scattered or facet reflected) light from a light extraction element, the amount of the redirected (e.g., scattered or facet reflected) light that reaches the output surface 102 at an angle that overcomes TIR (e.g., light that falls outside the critical angle $\pm\theta_0$ as measured relative to the output surface 102) can be increased, as compared to a light guide bar with side walls that do not perform partial collimation.

The side walls 106a and 106b can be configured to reflect light (e.g., by TIR) that was redirected (e.g., scattered) by the light extraction elements 112, thereby at least partially collimating the redirected light (e.g., in the xz-plane). Thus, the light extraction elements 112 can function to "input" light to the collimating reflector side walls 106a and 106b. Thus, the collimating reflector side walls 106a and 106b can have an input area 142 located at the back side 104 of the light guide bar 100 and an output area 144 at the output surface 102. The input area 142 can be referred to an "input area" with respect to the collimating side walls 106a and 106b even though the input area 142 does not input light to the light guide bar 100 from an external light source. Although FIG. 17 shows a light scattering feature 112 positioned at the input area 142 to "input" light to the reflector side walls 106a and 106b, in other implementations, a reflector 128 can be positioned at or near the input area 142 to "input" light to the reflector side walls 106a and 106b. The input area 142 can have a width $w_1$ along the x-direction that is smaller than a width $w_2$ of the output area 144 along the x-direction. As can be seen in FIG. 17, the surfaces of the side walls 106a and 106b can be mathematically shaped surfaces and can substantially conform, for example, to a portion of a parabola in the xz-plane. The shape of the side walls 106a and 106b can also be a tilted plane surface or a wide variety of polynomially shaped surfaces. In some implementations, the left end of the input area 142 can be located at substantially the focal point of the parabolic curvature of the right side wall 106a, and/or the right end of the input area 142 can be located at substantially the focal point of the parabolic curvature of the left side wall 106b. The first parabolic curve (associated with the right side wall 106a) can be angled with respect to the second parabolic curve (associated with the left side wall 106b). In some implementations, the cross-sectional shape (e.g., shown in FIG. 17) can be extruded, or otherwise formed into an elongate light guide bar 100, and the side walls 106a and 106b can, for example, define a shape similar to compound parabolic concentrator (CPC) trough.

In some implementations, the side walls 106a and 106b can be configured to substantially preserve etendue of the light exiting the light guide bar 100 through the output surface 102. In some implementations, the mathematical shape(s) of one or both of the side walls 106a and 106b can be governed by Sine Law reflector design. For example, the light scattering features 112 can substantially fill the input area 142 in the direction (e.g., the x-direction) transverse to the longitudinal axis 105, so that the light scattering features direct light at the side walls 106a and 106b from across substantially the full width $w_1$ of the input area 142. If the angle of distribution of light from the light extraction elements in the xz-plane is $\pm\theta_1$ and light exits the output surface 102 over the width $w_2$ (of the output area in the x-direction) and an emission distribution of $\pm\theta_2$, then $w_1 \times \sin\theta_1$ can substantially equal $w_2 \times \sin\theta_2$, and the distance d between the input area 142 and the output area 144 can substantially equal $0.5 \times (w_1+w_2)/\tan\theta_2$. In some implementations in which the emission distribution $\pm\theta_1$ from the light extraction elements is about $\pm 90°$, $w_1 \times \sin\theta_1$ is $w_1 \times \sin 90°$, and since $\sin 90°$ equals 1, $w_1$ can substantially equal $w_2 \times \sin\theta_2$. In some implementations in which the emission distribution $\pm\theta_1$ is about $\pm 90°$, and the emission distribution $\pm\theta_2$ is about $\pm 25°$, the width $w_1$ of the input area 142 can be about 1.26 millimeters (mm), the width $w_2$ of the output area 144 can be about 3.0 mm, and the distance d between the input area 142 and the output area 144 can be about 4.55 mm. Although the dimensions discussed above are provided in mm, the same calculations can be performed using arbitrary length units to achieve similar angles of light collimation. Thus, various length units (e.g., centimeters, inches, micrometers, etc.) can be applied to the values listed above to provide implementations of light guide bars with different sizes and the same or similar proportions.

Various other dimensions can be selected and calculated using Sine Law principles. For example, one or more variable may be known, such as the width $w_1$ (e.g., based at least partially on the size and configuration of the light guide bar 100 and/or the light extraction elements, etc.), the width $w_2$ (e.g., based at least partially on the size and configuration of a light guide bar 100), the emission distribution $\pm\theta_1$ (e.g., based at least partially on the light extraction elements), the emission distribution $\pm\theta_2$ (e.g., based at least partially on the size and configuration of the light guide bar 100, or on properties of the illumination system being illuminated by the light guide bar 100, etc.), and the distance d (e.g., based at least partially on the size and configuration of the light guide bar 100, or on properties of the illumination system being illuminated by the light guide bar 100, etc.), which can allow for calculation of one or more unknown variables.

The side walls 106a and 106b can be configured to at least partially collimate light towards the output surface 102 by reflecting the light that strikes the side walls 106a and 106b. The light can be reflected to TIR, and the curvature of the side walls 106a and 106b can be configured so that light redirected by the light extraction elements (e.g., scattered by the light scattering feature 112 of FIG. 17) strikes the side walls 106a and 106b at angles that cause the light to experience TIR along substantially the entire height (in the z-direction) of the side walls 106a and 106b. In some implementations, the curvature of the side walls 106a and 106b near the input area 142 can be insufficient to cause TIR for at least some of the light received from the light extraction elements, and one or more reflectors 145a and 145b (e.g., reflective coatings) can be used to facilitate reflection at the portions of the side walls 106a and 106b near the input area 142. In some implementations, the one or more reflectors 145a and 145b can extend along at least about 10%, 20%, 30%, or 50% of the distance from the input area 142 toward the output area 144. In some other implementations, the reflectors 145a and 145b extend over substantially the entirety of the side walls 106a and 106b.

Light redirected (e.g., scattered) by the light extraction elements propagating in the yz-plane within the light guide bar 100 can preserve the distribution (e.g., Lambertian) defined by the light extraction elements 112 (e.g., because side walls 106a and 106b do not collimate light propagating in the yz-plane). However, when the redirected light propagating in the yz-plane reaches the output surface 102, some of the redirected light can continue to be captured within the light guide bar 100 by TIR. Thus, the light exiting the output surface 102 can effectively be partially collimated in the yz-plane, since only light propagating with angles that overcome TIR exit the output surface 102. For example, if the light guide bar 100 has a refractive index of about 1.47, the critical angle for an interface between the output surface 102 and air would be about 47.1° (as measured relative to the output surface 102). In this implementation, the light guide bar 100 would effectively partially collimate light (even in the yz-direction) so that it exits the output surface within a range of angles of about ±42.9° (as measured relative to the normal to the output surface 102). In some implementations, the light guide bar 100 can provide more collimation from the side walls 106a and 106b (e.g., in the xz-plane) than that provided by TIR of light exiting the light guide bar 100.

In some implementations, facets 124 and/or scattering features 112 can redirect a portion of the light propagating in the light guide bar 100, as discussed above. Some light can be redirected out of the light guide bar 100 without impinging on the sidewalls 106a and 106b (e.g., light propagating in the yz-plane). Some light can be reflected by the side walls at an angle that is smaller than the critical angle so that the light is totally internally reflected by the side walls 106a and 106b. The angle at which light strikes the side walls 106a and 106b can depend, at least in part, on the angular distribution of the light input into the light guide bar 100. In some cases, a portion of the light redirected by a facet 124 can have an angle that does not overcome TIR, and the light can continue to propagate along the light guide bar 100 (e.g., until the light is reflected by another facet 124, which can redirect the light out of the light guide bar 100). A portion of the light propagating along the light guide bar 100 can impinge on the sidewalls 106a and 106b (e.g., as skew rays), and can be reflected by the sidewalls 106a and 106b. In some cases, the reflection of the light by the side walls 106a and 106b can redirect the light to angles that are more likely to cause the light to be redirected out of the light guide bar 100 (e.g., by a subsequent reflection by a facet 124. As discussed above, redirecting light out of the light guide bar 100 using facets 124 can be more efficient than redirection light out of the light guide bar 100 using scattering features 112, which can be absorptive.

Figure 18:
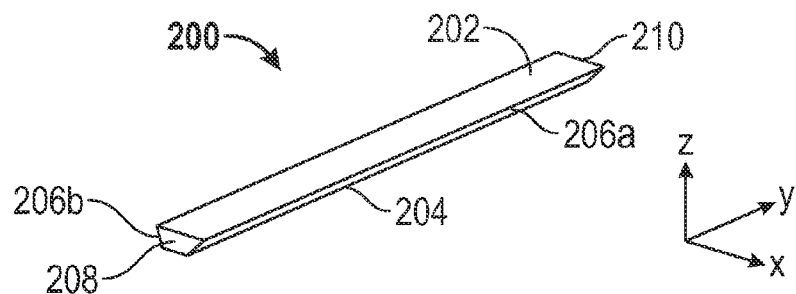
FIG. 18 shows an example of an isometric view of a light guide bar having a substantially trapezoidal cross-sectional shape.
Figure 19:
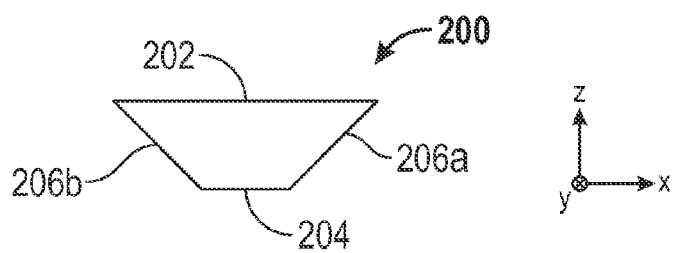
FIG. 19 shows an example of a cross-sectional view of the light guide bar of FIG. 18.

Various other cross-sectional shapes can be used for the light guide bar, other than that shown in FIG. 17. In some implementations, the side walls can be straight instead of being curved. FIG. 18 shows an example of an isometric view of a light guide bar having a substantially trapezoidal cross-sectional shape. FIG. 19 shows an example of a cross-sectional view of the light guide bar of FIG. 18. The light guide bar 200 can have an output surface 202, a back side 204, and ends 208 and 210 similar to the output surface 102, back side 104, and ends 108 and 210 (e.g., of FIGS. 1-17), respectively. The sidewalls 206a and 206b of the light guide bar 200 can be substantially planar so that the light guide bar 200 has a substantially trapezoidal cross-sectional shape (as shown in FIG. 19). The light guide bar 200 can also include light extraction elements (not shown in FIG. 18) similar to those discussed elsewhere herein, which can be configured to direct light out of the light guide bar 200 through the output surface 202.

Figure 20:
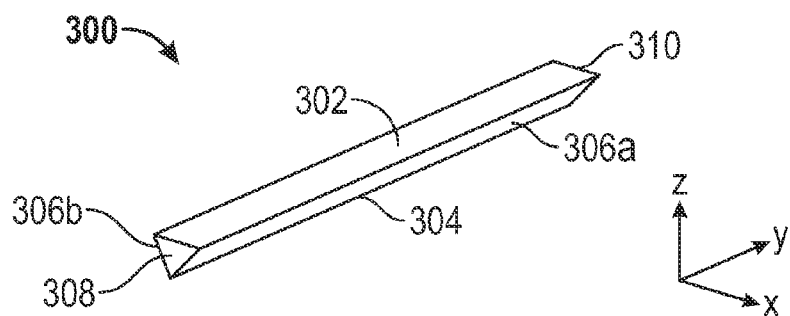
FIG. 20 shows an example of an isometric view of a light guide bar having a substantially triangular cross-sectional shape.
Figure 21:
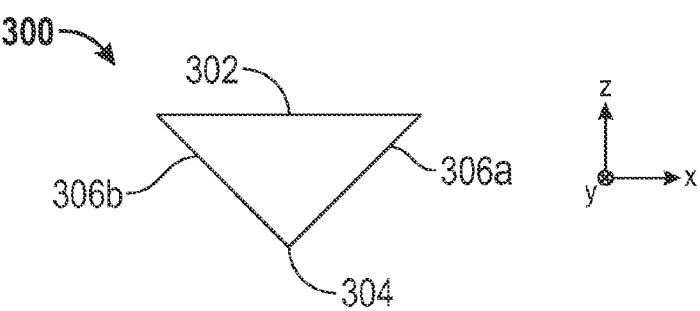
FIG. 21 shows an example of a cross-sectional view of the light guide bar of FIG. 20.

FIG. 20 shows an example of an isometric view of a light guide bar having a substantially triangular cross-sectional shape. FIG. 21 shows an example of a cross-sectional view of the light guide bar of FIG. 20. The light guide bar 300 can have an output surface 302 and ends 308 and 310 similar to the output surface 102 and ends 108 and 110, respectively. The sidewalls 306a and 306b of the light guide bar 300 can be substantially planar and can converge at the back side 304 so that the light guide bar 300 has a substantially triangular cross-sectional shape (as shown in FIG. 21). The light guide bar 300 does not include surface opposite the output surface 302 because the side walls 306a and 306b converge at the back side 304. The light guide bar 300 can also include light extraction elements (not shown in FIG. 20) similar to those discussed elsewhere herein, which can be configured to direct light out of the light guide bar 300 through the output surface 302. For example, light extraction elements can be disposed at lower portions of the side walls 306a and 306b near the back side 304, and/or light extraction elements can be disposed along the output surface 302 and a reflector (not shown) can be positioned at lower portions of the side walls 306a and 306b near the back side 304.

Figure 22:
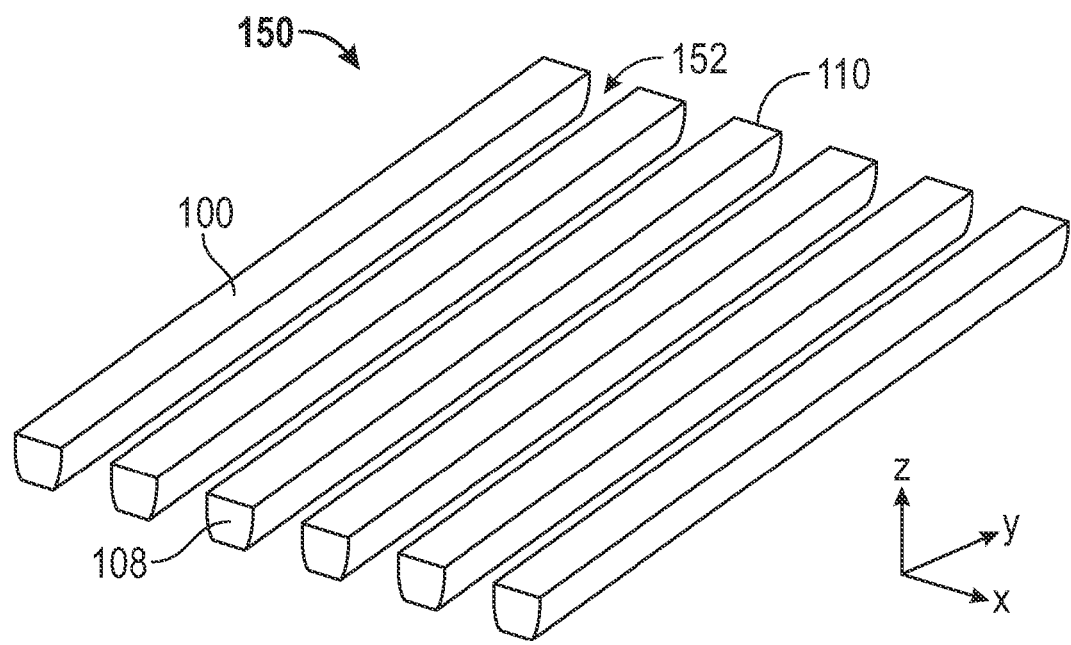
FIG. 22 shows an example of an isometric view of an array of light guide bars.

While a single light guide bar 100 can be used in various implementations, in some other implementations, multiple light guide bars 100 can be used together to provide illumination for a particular lighting application. FIG. 22 shows an example of an isometric view of an array of light guide bars. Each light guide bar 100 of the array 150 can be similar to, or the same as, the light guide bar 100 or any other of the light guide bar implementations disclosed herein. In some implementations, each of the light guide bars 100 in the array 150 can be substantially identical to the other light guide bars 100, except for its position in the array 150. In some implementations, the light guide bars 100 can differ depending on their position in the array 150, so as to produce the particular light distribution desired for the particular lighting application. Light can be directed into the light guide bars 100 by respective light sources, which can be similar to the light source 114 discussed elsewhere herein. One or more, or all, of the light guide bars 100 can have a light source at each end 108 and/or 110 thereof. In some implementations, each of the light guide bars 100 can have a single light source, which can all be positioned on the same side of the respective light guide bars (e.g., the end 108), or can be positioned at alternating ends 108 and 110 along the array 150. In some other implementations, a single light source can inject light into one or more of the light guide bars 100. As shown in FIG. 22, the light guide bars 100 can be spaced apart from each other in the x-direction forming gaps 152 therebetween.

Figure 23:
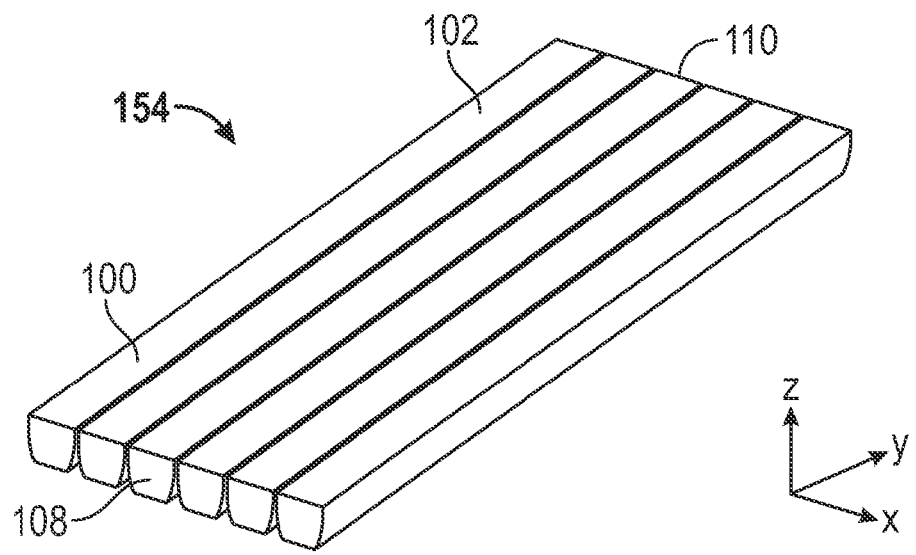
FIG. 23 shows an example of an isometric view of an array of light guide bars that are joined to form a sheet of light guide bars.

FIG. 23 shows an example of an isometric view of an array of light guide bars that are joined to form a sheet of light guide bars. The light guide bars 100 can be adjacent to one another so that there is substantially no open space between adjacent light guide bars 100. The light guide bars 100 of the sheet 154 can be illuminated with light sources in various manners similar to those discussed in connection with the array 150 of FIG. 22.

Figure 24:
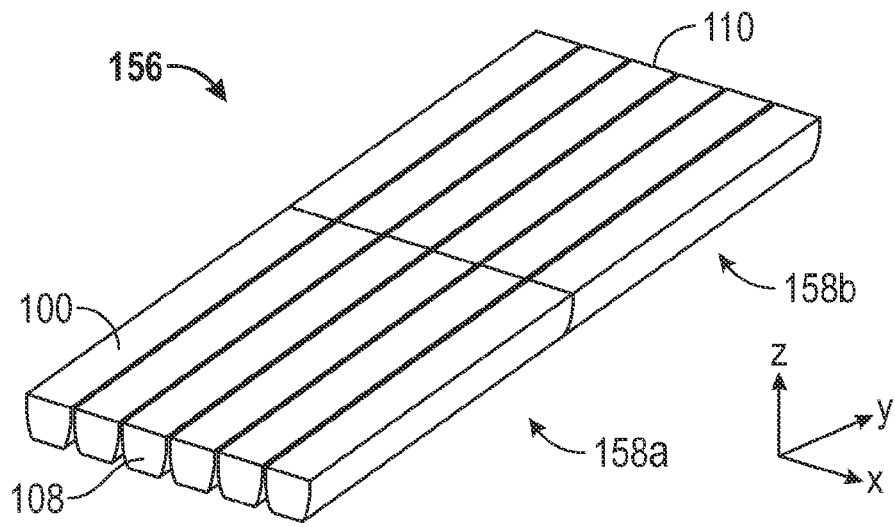
FIG. 24 shows an example of an isometric view of an array of light guide bars that includes multiple rows of light guide bars.

FIG. 24 shows an example of an isometric view of an array of light guide bars that includes multiple rows of light guide bars. The light guide bars 100 can be joined to form a sheet, as shown in FIG. 24, or the light guide bars 100 can be spaced apart to form gaps therebetween in a manner similar to that shown in FIG. 22. In some implementations, the first row 158a of light guide bars 100 can receive light from light sources positioned at the respective first ends 108 of the light guide bars 100, and the second row 158b of the light guide bars 100 can receive light from light sources positioned at the respective second ends 110 of the light guide bars 100.

Figure 25:
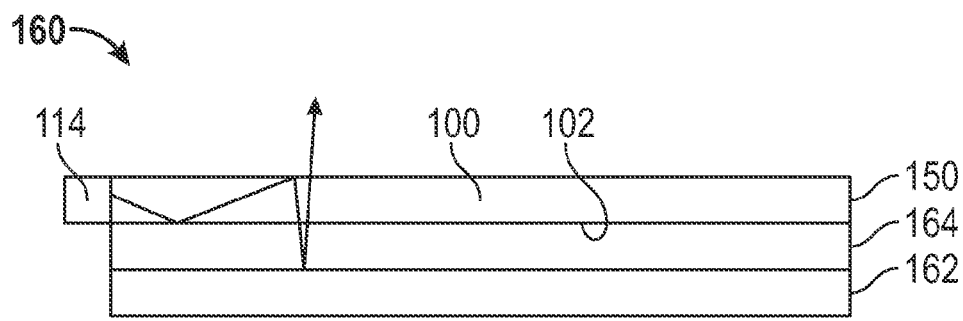
FIG. 25 shows an example of a cross-sectional view of a portion of a display device that uses one or more light guide bars for illuminating reflective display elements.

The light guide bars disclosed herein can be used to illuminate various display devices. FIG. 25 shows an example of a cross-sectional view of a portion of a display device that uses one or more light guide bars for illuminating reflective display elements. An array of light guide bars 100 (e.g., the array 150 of FIG. 22) can be positioned in front of the display elements 162. In FIG. 25, the display elements 162 can be reflective display elements configured to reflect light to form an image viewable to a user. The display elements 122 can include, for example, a plurality of interferometric modulators (such as the interferometric modulators 12 of FIG. 1), which can be arranged in an array to form pixel elements, as discussed herein. One or more light sources 114 can direct light into the light guide bars 100 of the light guide bar array 150, and the light guide bars 100 can direct light out of the output surfaces 102 as discussed herein. The light output from the light guide bars 100 can illuminate the display elements 162 to form an image viewable to a user, as discussed herein. In some implementations, a substrate 164 (e.g., positioned between the light guide bar array 150 and the display elements 162) can be used to provide support for various other features, such as the display elements 162. Since the light guide bar array 150 can be positioned between the display elements 162 and the viewer, the light guide bar array 150 can be configured to not substantially interfere with visibility of the image produced by the display elements 162. For example, the light guide bars 100 can be spaced apart from each other (as shown in FIG. 22, or with larger gaps 152 than shown in FIG. 22) so that much of the light forming the image can pass from the display elements 162 through the gaps 152 without being affected by the light guide bar array 150. The light guide bars 100 can be made of a size that is sufficiently small that the light from the image that is affected by the light guide bars 100 does not significantly interfere with the overall image.

Figure 26:
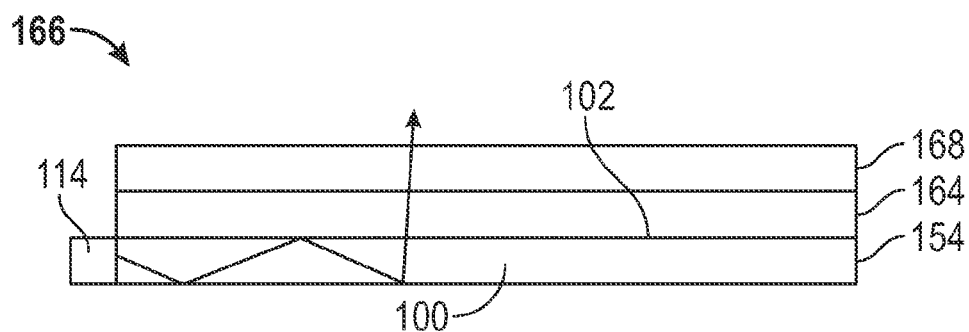
FIG. 26 shows an example of a cross-sectional view of a portion of a display device that uses one or more light guide bars for illuminating transmissive display elements.

FIG. 26 shows an example of a cross-sectional view of a portion of a display device that uses one or more light guide bars for illuminating transmissive display elements. An array of light guide bars 100 (e.g., the array 154 of FIG. 23 (although the light guide bar array 150 of FIG. 22 or the light guide bar array 156 of FIG. 24 can also be used)) can be positioned behind the display elements 168. In FIG. 26, the display elements 162 can be transmissive display elements, such as liquid crystal display (LCD) pixel elements. One or more light sources 114 can direct light into the light guide bars 100 of the light guide bar array 154, and the light guide bars 100 can direct light out of the output surfaces 102 as discussed herein. The light output from the light guide bars 100 can illuminate the display elements 168 to form an image viewable to a user. In some implementations, a substrate 164 (e.g., positioned between the light guide bar array 154 and the display elements 168) can be used to provide support for other structures, such as the display elements 168.

Figure 27:
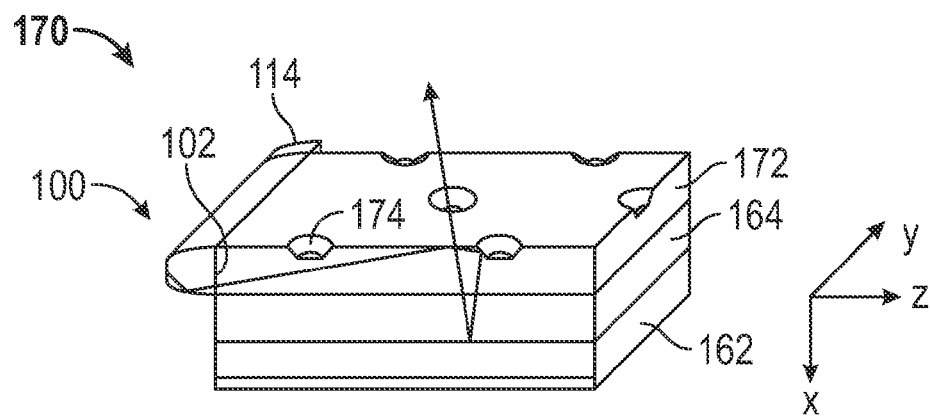
FIG. 27 shows an example of an isometric view of a portion of a display device having a light guide plate and using a light guide bar to direct light into the light guide plate.

FIG. 27 shows an example of an isometric view of a portion of a display device having a light guide plate and using a light guide bar to direct light into the light guide plate. The light guide bar 100 can be configured to partially collimate light, as discussed herein. One or more light sources 114 can direct light into the light guide bar 100, which can partially collimate light in the xz-plane. A light guide plate 172 of the display device 170 can be optically coupled to the light guide bar 100 to receive light exiting the output surface 102. The light guide plate 172 can be configured to propagate light by TIR, and the light guide plate 172 can include light extraction elements 174 configured to turn light propagating in the light guide plate 172 so that the turned light exits the light guide plate 172 towards the display elements 162 of the display device 170. In FIG. 27, the display elements 162 can be reflective display elements configured to reflect light to form an image viewable to a user. The display elements 162 can include, for example, a plurality of interferometric modulators (such as the interferometric modulators 12 of FIG. 1), which can be arranged in an array to form pixel elements, as discussed herein. In some implementations, the display device 170 can include a substrate layer 164, which can be disposed between the light guide plate 172 and the display elements 162.

Figure 28:
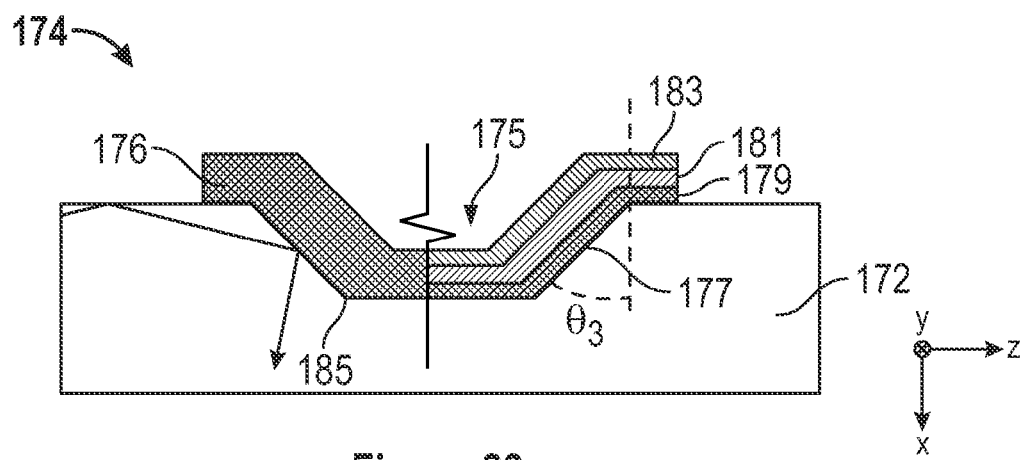
FIG. 28 shows an example of a cross-sectional view of implementations of light extraction elements that can be used with the light guide plate of FIG. 27.

Various types of light extraction elements 174 can be used to redirect light that is propagating through the light guide plate 172 towards the display elements 162. For example, the light extraction elements 174 can be configured to provide a substantially uniform distribution of light from the light guide plate 172 towards the display elements 162. In FIG. 27, the light guide plate 172 includes frusta light turning features 174 dispersed across the surface of the light guide plate 172. The light extraction elements 174 can be recesses (e.g., cone-shaped recesses, etc.) extending into the light guide plate 172 (e.g., formed in an outer surface of the light guide plate 172). FIG. 28 shows an example of a cross-sectional view of implementations of light extraction elements that can be used with the light guide plate 172 of FIG. 27. In the implementation shown on the left in FIG. 28, a reflective coating 176 (e.g., a metal, such as aluminum or silver) can be applied above a recess 175 to facilitate reflection of the light that strikes the recess 175 (e.g., if a refractive index difference between the material of the light guide plate 172 and the material filling the recess 175 (e.g., air in some implementations) is insufficient to cause light to be sufficiently redirected by TIR). In some implementations, the reflective coating 176 can be omitted, and the light can be turned by the light extraction element 174 by TIR. In some implementations, the coating 176 can have an index of refraction lower than the index of refraction of the material of the light guide plate 172, thereby facilitating TIR. For example, the light guide plate 176 can have an index of refraction of about 1.52. In some implementations, an optical isolation layer (not shown) can be below the light guide plate 172 and can have an index of refraction of about 1.42 to about 1.47. In some implementations, the coating 176 can have an index or refraction of about 1.42, or of about 1.42 to about 1.47. Materials having other indices of refraction can also be used.

As shown on the right side of FIG. 28, in some implementations, a multilayer stack of different materials can be deposited over the recess 175. The multilayer stack can be an interferometric stack designed to be highly reflective for light that strikes the stack from below (from the light guide plate 172), and to have low reflectivity for light that strikes the stack from above (e.g., from the direction of the viewer). In some implementations, a reflective layer can be deposited below a black mask or other light blocking layers. In the implementation shown on the right side of FIG. 28, an aluminum layer 179 can be deposited over the recess 175, a silicon dioxide ($SiO_2$) layer 181 can be deposited over the aluminum layer 179, and a molybdenum chromium (MoCr) layer 183 can be deposited over the $SiO_2$ layer 181. Various other configurations are possible. In FIG. 28, the recess 175 is shown with sharp transitions 185, although curved transitions can also be formed in some implementations.

The layers 176, 179, 181, and 183 of FIG. 28 can be deposited by sputtering, chemical vapor deposition, evaporation deposition, and other suitable deposition processes. The layers 176, 179, 181, and 183 can be deposited across the top of the light guide plate 172 and unwanted portions of the layers 176, 179, 181, and 183 can be removed, for example by photolithography processes. In some implementations, a positive photoresist can be used and unwanted photoresist can be exposed (e.g., to UV light) while the portions of the photoresist to be kept can be masked. In some implementations, a negative photoresist can be used and unwanted photoresist can be masked while the portions of the photoresist to be kept can be exposed (e.g., to UV light). The unwanted portions of the photoresist can be removed using a chemical or developer, followed by reactive ion or other types of etching to remove the unwanted material of the layers 176, 179, 181, or 183 not covered by the remaining photoresist.

As shown in FIG. 27, the light extraction elements 174 can turn the light in the xz-plane so that the light can overcome TIR and exit the light guide plate 172. In some implementations, the light extraction elements 174 can have surfaces that are curved or otherwise not aligned with or parallel to the y-axis, so that the light extraction elements 174 can change the direction of the light in the y-direction as well as the x and z directions. The light extraction elements 174 can be configured to redirect light propagating through the light guide plate 172 in various directions (similar to scattered light), for example to increase the uniformity of light distribution presented to the display elements 162. The light extraction elements on the light guide bar 100 can also be configured similar to the light extraction elements 174 on the light guide plate 172.

Referring again to FIG. 28, the side walls 177 of the recess 175 can be angled from a line normal to the surface of the light guide plate 172 by an angle $\theta_3$. The angle $\theta_3$ can be between about 30° and about 60°, between about 40° and about 50°, and the angle $\theta_3$ can be about 40°, about 45°, or about 50°, or the like. The angle $\theta_3$ of the side walls 177 of the light extraction feature 174 can be configured to turn the light out of the light guide plate 172 with substantially uniform distribution, and the angle $\theta_3$ can depend on the properties of the light guide plate 172 and on other properties of the illumination system.

Figure 29:
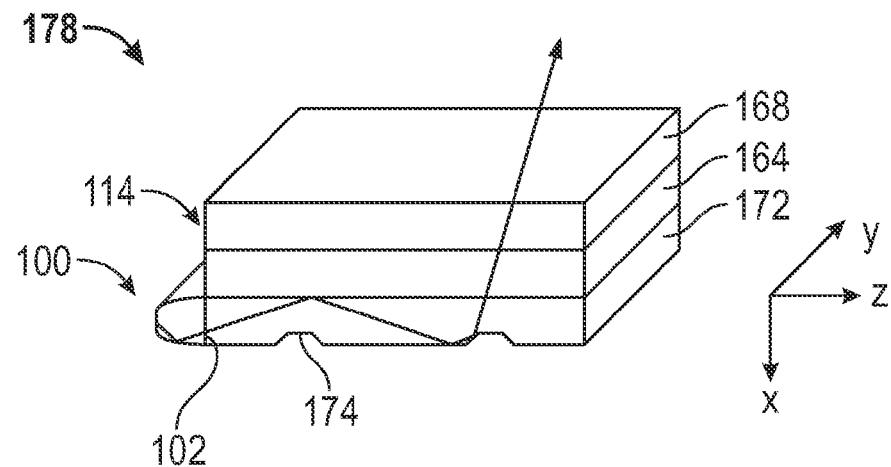
FIG. 29 shows an example of an isometric view of a portion of a display device using a light guide bar for illuminating display elements.

Various types of display elements can be illuminated by the light guide bar 100 and light guide plate 172. Examples of display elements include liquid crystal display (LCD) elements and electrophoretic display elements. FIG. 29 shows an example of an isometric view of a portion of a display device using a light guide bar for illuminating display elements. The display device 178 includes transmissive display elements 168 (e.g., LCD pixels). One or more light sources 114 (hidden from view in FIG. 29) can emit light into the light guide bar 100, which can be configured to at least partially collimate light, as discussed herein. The output surface 102 of the light guide bar 100 can be coupled to a light guide plate 172, in a manner similar to that disclosed for FIG. 27. The light extraction elements 174 on the light guide plate 172 can be similar to those of FIGS. 27 and 28, except that the light extraction elements 174 of FIG. 29 are configured to redirect light upward toward the transmissive display elements 168. In some implementations, the display device 178 can include a substrate layer 164, which can be between the light guide plate 172 and the display elements 168 and which can provide support for other features. Thus, the light sources 114, light guide bars 100, and light guide plates 172 disclosed herein can function as a back light for a transmissive display device 178 (e.g., as illustrated in FIG. 29) or a front light for a reflective display device 170 (e.g., as illustrated in FIG. 27).

Figure 30:
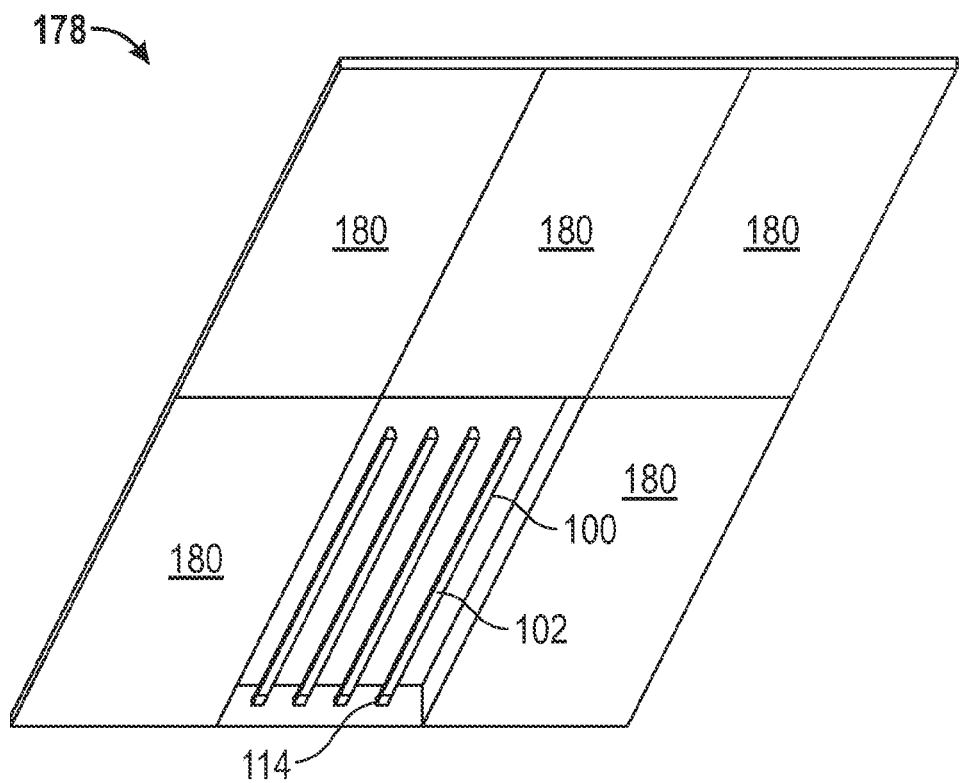
FIG. 30 shows an example of an isometric view of a lighting system for overhead lighting.

FIG. 30 shows an example of an isometric view of a lighting system for overhead lighting. The lighting system 178 can include one or more light guide bars 100, which can be similar to, or the same as the light guide bar 100 of FIG. 9, or any other suitable light guide bar disclosed herein. Light sources 114 can direct light into the respective light guide bars 100, and the light guide bars 100 can be configured to direct light out of the output surfaces 102 so that the light propagates downward to illuminate a room or task area. The light guide bars 100 can be configured to at least partially collimate the light exiting the output surfaces 102 to provide a particular light distribution for the room or task area. The lighting system 178 can be incorporated into the ceiling of a room (e.g., surrounded by acoustic tiles 180). The lighting system 178 can be embedded into ceiling materials (e.g., for architectural design and/or for large area lighting purposes). For example, ceiling materials available from Hunter Douglas can incorporate the light guide bars disclosed herein.

Figure 31:
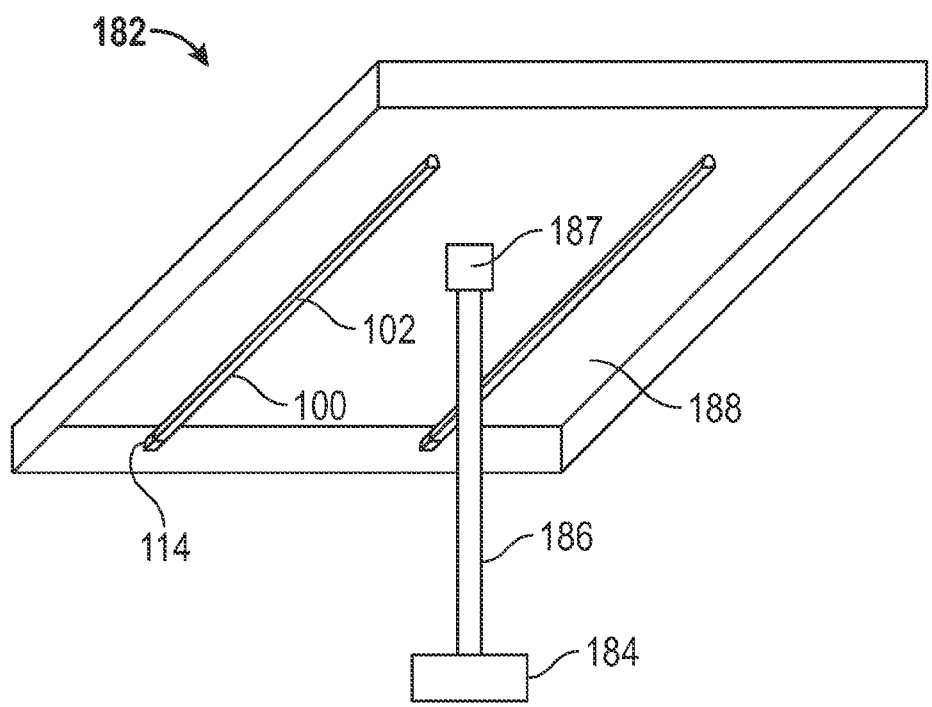
FIG. 31 shows an example of an isometric view of a lamp that includes one or more light guide bars for illuminating a target lighting area.

FIG. 31 shows an example of an isometric view of a lamp that includes one or more light guide bars for illuminating a target lighting area. The lamp 182 can include a base 184 and a stand 186 configured to suspend the light guide bars 100 above the target lighting area. As shown, the light guide bars 100 can be angled with respect to the stand 186 to provide illumination to a target area that is not centered around the lamp 182. A cover 188 can support the light guide bars 100, the cover 188 may be coupled to the stand 186 with a ball joint or the like to allow adjustment of the angle of the light guide bars 100 with respect to the stand 186. Light sources 114 can direct light into the light guide bars 100, and the light guide bars 100 and direct light out of the output surfaces 102 towards the target lighting area. Electrical cables can extend through the stand 186, and through a portion of the cover 188 to the light sources 114 to provide power and/or control signals to the light sources 114. In some implementations, the light sources 114 can be in or near the juncture 187 between the stand 186 and the cover 188 so that the electrical cables do not extend through the cover 188. In some implementations, a plurality of light guide bars 100 can extend radially outward from the juncture 187 between the stand 186 and the cover 188, and in some cases a single light source 114 (e.g., in or near the juncture 187) can illuminate multiple, or all, light guide bars 100 extending radially from the juncture 187.

Various other lighting systems can use the light guide bars disclosed herein. The light guide bars disclosed herein provide flexibility to design distributions of light for various lighting applications. For example, a light guide bar can be disposed on the back side of a speedometer needle so that the output surface of the light guide bar faces towards the back plate of the speedometer. A light source can direct light into the light guide bar (e.g., at the base of the needle), and the light guide bar can be configured to propagate the light towards the tip of the needle where light extraction elements can direct the light out of the light guide bar. By positioning the light extraction elements near the area of the needle that overlaps the speed information written on the back plate of the speedometer, the light output from the light guide bar can illuminate a region of the speedometer to emphasize the information indicative of the current speed of the vehicle. The light guide bars disclosed herein can be used for illuminating a wide range of display devices and other electromechanical systems.

Figure 32:
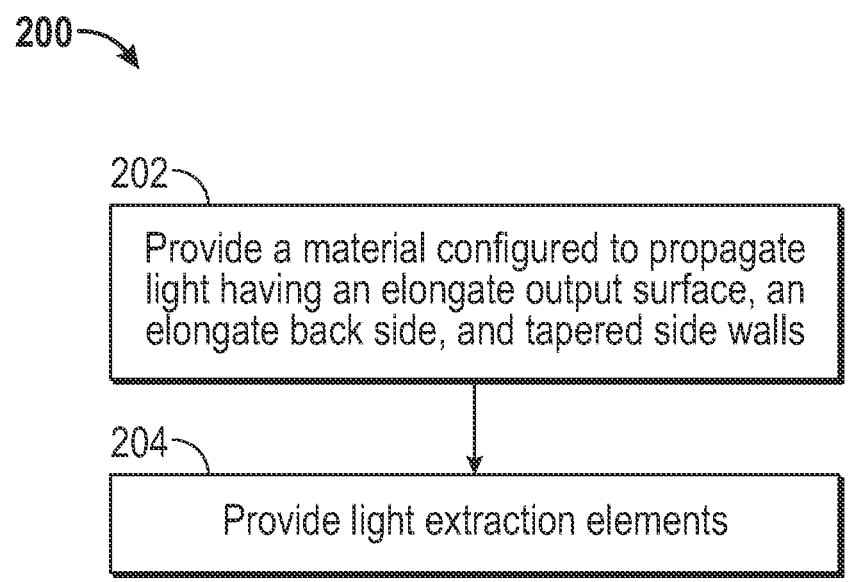
FIG. 32 shows an example of a flowchart of an implementation of a method for making a light guide.

FIG. 32 shows an example of a flowchart of an implementation of a method for making a light guide. The light guide can substantially be in the shape of a bar with a length longer than a width, such as in the light guide bar 100 described above or the other implementations described herein. The method 200 can include providing a material configured to propagate light therein at block 202. The material can be shaped to have an elongate output surface 102, an elongate back side 104 opposite the output surface 102, and one or more tapered side walls 106a and 106b that extend from the output surface 102 to the back side 104. The output surface 102 can be wider than the back side 104. The tapered side walls 106a and 106b can be configured to partially collimate light directed out of the output surface 102. The method can include, at block 204, providing light extraction elements (such as scattering features 112 or facets 124) along the length of the light guide. The light extraction elements can be configured to direct light out of the light guide through the output surface 102.

Figure 33A:
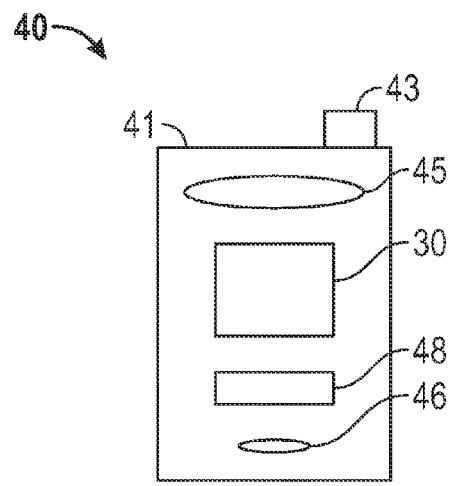
FIGS. 33A and 33B show examples of system block diagrams illustrating a display device that includes a plurality of interferometric modulators.
Figure 33B:
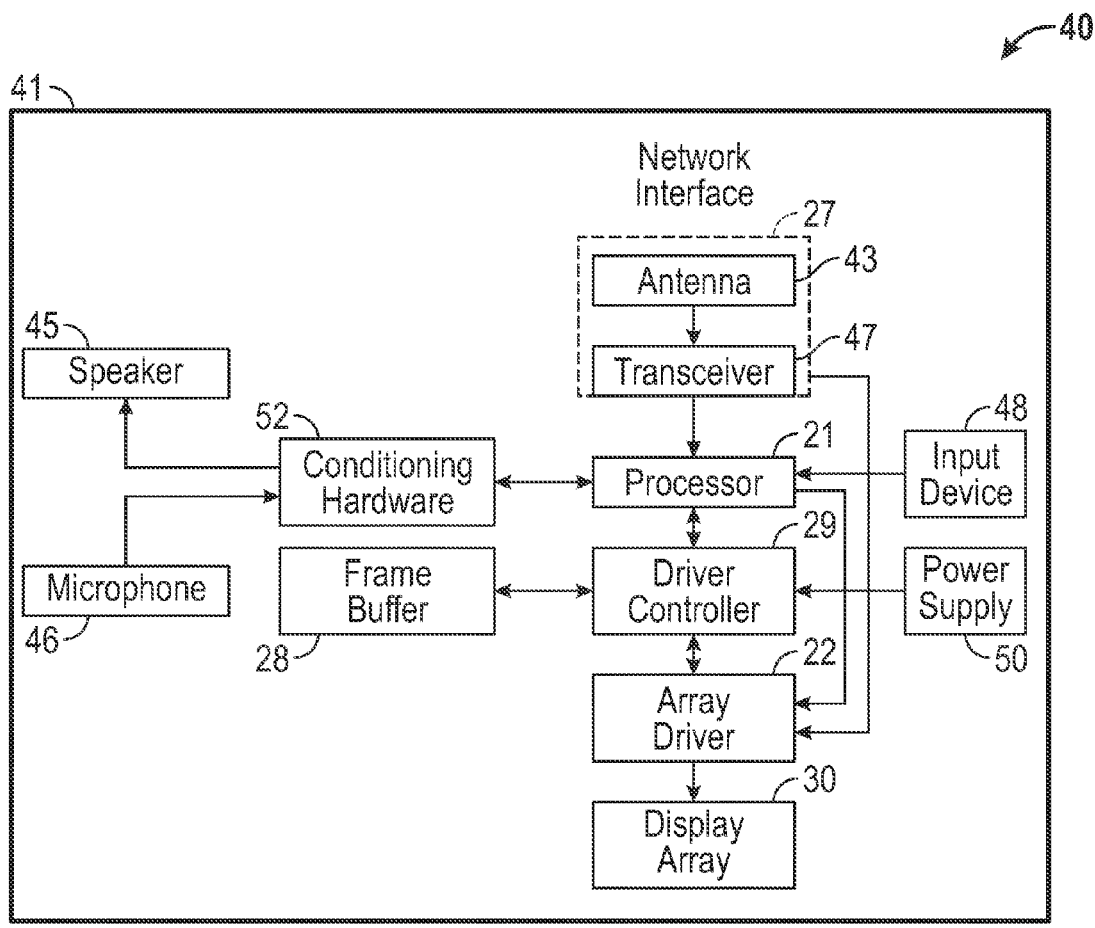

FIGS. 33A and 33B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 33B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11 (a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), NEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays.

In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An illumination system comprising:
    a light guide substantially having a shape of a bar with a length longer than a width, and formed of a material configured to propagate light therein, the light guide including:
        an elongated output surface;
        an elongated back side opposite the output surface, wherein the output surface is wider than the back side;
        light extraction elements dispersed along the length of the light guide, wherein the light extraction elements are configured to direct light out of the light guide through the output surface; and
        one or more tapered side walls that extend from the output surface to the back side, wherein the tapered side walls are configured to partially collimate the light directed out of the output surface.

2. The illumination system of claim 1, wherein a taper of the side walls follows at least one of a tilted plane surface and a polynomially shaped surface.

3. The illumination system of claim 2, wherein the side walls have the shape of a compound parabolic concentrator (CPC) trough.

4. The illumination system of claim 1, wherein a longitudinal axis extends along the length of the light guide, and the one or more side walls of the light guide are configured to partially collimate the light directed out of the output surface such that light that exits the output surface in a plane substantially orthogonal to the longitudinal axis is substantially confined to a range of output angles of about ±60° or less relative to a direction normal to the output surface.

5. The illumination system of claim 1, wherein the side walls are planar such that the light guide has a generally trapezoidal cross sectional shape.

6. The illumination system of claim 1, wherein the side walls converge at the back side of the light guide such that the light guide has a generally triangular cross sectional shape.

7. The illumination system of claim 1, wherein the back side includes an elongated back surface opposite the output surface.

8. The illumination system of claim 7, wherein the back surface is substantially planar.

9. The illumination system of claim 1, wherein the light extraction elements are reflective.

10. The illumination system of claim 9, wherein the light extraction elements include one or more scattering features.

11. The illumination system of claim 9, wherein the light extraction elements include one or more reflective facets.

12. The illumination system of claim 1, further comprising a reflector, wherein the light extraction elements are located on the output surface of the light guide, and wherein the reflector is located proximate the back side of the light guide, wherein the light extraction elements are configured to turn incident light towards the reflector, and wherein the reflector is configured to redirect the turned light out of the output surface.

13. The illumination system of claim 1, wherein the light extraction elements are dispersed along substantially the entire length of the light guide.

14. The illumination system of claim 1, further comprising a light source configured to direct light into the light guide through a first end surface of the light guide, wherein the first end surface extends between the output surface, the back side, and the side walls.

15. A display device comprising:
the illumination system of claim 1; and
an array of display elements positioned to receive light from the illumination system.

16. The display device of claim 15, wherein the display elements are reflective.

17. The display device of claim 16, wherein the display elements include interferometric modulators (IMODs).

18. The display device of claim 15, further comprising:
a processor that is configured to communicate with the display elements, the processor being configured to process image data; and
a memory device that is configured to communicate with the processor.

19. The display device of claim 18, further comprising:
a driver circuit configured to send at least one signal to the display elements; and
a controller configured to send at least a portion of the image data to the driver circuit.

20. The display device of claim 18, further comprising an image source module configured to send the image data to the processor.

21. The display device of claim 20, wherein the image source module includes at least one of a receiver, transceiver, and transmitter.

22. The display device of claim 18, further comprising an input device configured to receive input data and to communicate the input data to the processor.

23. A method of making a light guide substantially having a shape of a bar with a length longer than a width, the method comprising:
providing a material configured to propagate light therein, the material shaped to have an elongated output surface, an elongated back side opposite the output surface, and one or more tapered side walls that extend from the output surface to the back side, wherein the output surface is wider than the back side, and wherein the tapered side walls are configured to partially collimate light directed out of the output surface; and
providing light extraction elements along the length of the light guide, wherein the light extraction elements are configured to direct light out of the light guide through the output surface.

24. The method of claim 23, wherein providing the light extraction elements includes forming the light extraction elements on the output surface of the light guide, and wherein the method further comprises:
providing a reflector proximate the back side of the light guide;
wherein the light extraction elements are configured to turn incident light towards the reflector; and
wherein the reflector is configured to redirect the turned light out of the output surface.

25. The method of claim 23, further comprising optically coupling a light source to the light guide to direct light into the light guide through a first end surface of the light guide, wherein the first end surface extends between the output surface, the back side, and the side walls.

* * * * *